United States Patent
Ohira et al.

(10) Patent No.: US 8,110,622 B2
(45) Date of Patent: Feb. 7, 2012

(54) AROMATIC POLYCARBONATE RESIN COMPOSITION AND MANUFACTURING PROCESS THEREOF

(75) Inventors: Yoji Ohira, Tokyo (JP); Tetsushi Ono, Tokyo (JP); Hidekazu Ito, Tokyo (JP); Makoto Takagi, Tokyo (JP); Takuya Tomoda, Tokyo (JP); Hidenori Nakagawa, Tokyo (JP); Mitsuhiro Takeo, Tokyo (JP); Kazuhiko Koya, Tokyo (JP)

(73) Assignee: Teijin Chemicals Ltd., Tokyo (JP)

( * ) Notice: Subject to any disclaimer, the term of this patent is extended or adjusted under 35 U.S.C. 154(b) by 854 days.

(21) Appl. No.: 11/632,940

(22) PCT Filed: Apr. 6, 2005

(86) PCT No.: PCT/JP2005/007110
§ 371 (c)(1),
(2), (4) Date: Jan. 19, 2007

(87) PCT Pub. No.: WO2006/008858
PCT Pub. Date: Jan. 26, 2006

(65) Prior Publication Data
US 2007/0299169 A1 Dec. 27, 2007

(30) Foreign Application Priority Data

Jul. 20, 2004 (JP) ................. 2004-211287
Jul. 20, 2004 (JP) ................. 2004-211288
Aug. 2, 2004 (JP) ................. 2004-225406
Sep. 9, 2004 (JP) ................. 2004-262185

(51) Int. Cl.
*C08K 5/42* (2006.01)
*C08K 5/54* (2006.01)
(52) U.S. Cl. ........................ 524/165; 524/267

(58) Field of Classification Search ............. 524/394, 524/165, 267
See application file for complete search history.

(56) References Cited

U.S. PATENT DOCUMENTS

| 3,919,295 | A | * | 11/1975 | Wechsberg et al. ........... 562/113 |
| 4,001,175 | A | | 1/1977 | Mark |
| 4,925,975 | A | | 5/1990 | Aramaki et al. |
| 6,664,313 | B2 | | 12/2003 | Hirai et al. |

(Continued)

FOREIGN PATENT DOCUMENTS

JP            54-32456         10/1979

(Continued)

OTHER PUBLICATIONS

Machine translation of JP 2003-082218.*

(Continued)

*Primary Examiner* — Milton I Cano
*Assistant Examiner* — John Uselding
(74) *Attorney, Agent, or Firm* — Wenderoth, Lind & Ponack, L.L.P.

(57) ABSTRACT

A resin composition consisting of:
(1) 100 parts by weight of an aromatic polycarbonate resin;
(2) 0.008 to 0.13 part by weight of an alkali metal salt of a perfluoroalkylsulfonic acid having a fluoride ion content measured by ion chromatography of 0.2 to 1 ppm in terms of weight based on the weight of component B; and
(3) 0.01 to 5 parts by weight of silicone having a Si—H group and a phenyl group.
A process of manufacturing the resin composition and a method of preventing the melt dripping during combustion of the resin composition. The flame retardancy of the above aromatic polycarbonate resin composition comprising the fluorine-containing organic metal salt compound is improved.

6 Claims, 2 Drawing Sheets

U.S. PATENT DOCUMENTS

| | | | |
|---|---|---|---|
| 2003/0158309 A1* | 8/2003 | Ono et al. | 524/261 |
| 2004/0063824 A1* | 4/2004 | Takagi et al. | 524/115 |
| 2005/0159518 A1* | 7/2005 | Miyamoto et al. | 524/155 |

FOREIGN PATENT DOCUMENTS

| | | | |
|---|---|---|---|
| JP | 60-019335 | | 1/1985 |
| JP | 01-268671 | | 10/1989 |
| JP | 11/181265 | | 7/1999 |
| JP | 2001-031854 | | 2/2001 |
| JP | 2001-031855 | | 2/2001 |
| JP | 2001-115004 | | 4/2001 |
| JP | 2001-115162 | | 4/2001 |
| JP | 2001-270983 | | 10/2001 |
| JP | 2002-080707 | | 3/2002 |
| JP | 2002-265432 | | 9/2002 |
| JP | 2002-294063 | | 10/2002 |
| JP | 2003-082218 | * | 3/2003 |
| JP | 2003-183491 | | 7/2003 |
| JP | 2003-213114 | | 7/2003 |
| JP | 2003-226805 | | 8/2003 |
| JP | 2003-342462 | | 12/2003 |
| JP | 2004-010825 | | 1/2004 |
| JP | 2004-523643 | | 8/2004 |
| JP | 2005-112973 | | 4/2005 |
| JP | 2005-112974 | | 4/2005 |
| JP | 2005-146100 | | 6/2005 |
| JP | 2005-154582 | | 6/2005 |
| WO | 02/083777 | | 10/2002 |
| WO | 03/078130 | | 9/2003 |

OTHER PUBLICATIONS

Supplementary European Search Report dated Aug. 8, 2008 issued in connection with the European Application No. 05 73 0142.6 corresponding to the present U.S. application.

Japanese Office Action (with English translation) dated Jun. 22, 2010 in corresponding Japanese Patent Application No. 2004-262185.

Japaese Office Action (with English translation) dated Jul. 13, 2010 in corresponding Japanese Patent Application No. 2003-348007.

Japanese Office Action (with English translation) dated Jul. 13, 2010 in corresponding Japanese Patent Application No. 2004-211287.

Japanese Office Action (with English translation) dated Jul. 13, 2010 in corresponding Japanese Patent Application No. 2004-211288.

Japanese Office Action issued May 10, 2011 in corresponding Japanese Patent Application No. 2004-262185 (with English translation).

* cited by examiner

AROMATIC POLYCARBONATE RESIN COMPOSITION AND MANUFACTURING PROCESS THEREOF

This application is a U.S. national stage of International Application No. PCT/JP2005/07110, filed Apr. 6, 2005, which claims priority to JP 2004-211287, filed Jul. 20, 2004, JP 2004-211288, filed Jul. 20, 2004, JP 2004-225406, filed Aug. 2, 2004, and JP 2004-262185, filed Sep. 9, 2004.

TECHNICAL FIELD

The present invention relates to an aromatic polycarbonate resin composition. More specifically, it relates to an aromatic polycarbonate resin composition which is excellent in flame retardancy while suppressing melt dripping (may be referred to as "dripping" hereinafter) at the time of combustion. The present invention also relates to a process for manufacturing the resin composition. Further, the present invention relates to a method of preventing the melt dripping of an aromatic polycarbonate resin composition.

BACKGROUND ART

An aromatic polycarbonate resin is used as a material for manufacturing various molded articles in a wide variety of fields, making use of its transparency and impact resistance. In the application field of this aromatic polycarbonate resin, nowadays, attention is paid to flame retardancy at the time of a fire, and a resin composition having high flame retardancy besides the above characteristic properties is desired. To provide flame retardancy to an aromatic polycarbonate resin, there is proposed a flame retardant resin composition comprising a halogen-based compound or a phosphorus-based compound. This resin composition is used in OA equipment and home electric appliances which are strongly desired to be flame retardant. Further, a silicone-based flame retardant is proposed and attracts attention as a material having a low environmental load.

A large number of technologies for flame retarding an aromatic polycarbonate resin are proposed. One of them is, for example, a method in which an organic metal salt is added to flame retard an aromatic polycarbonate resin (see to Patent Documents 1 and 2). Since the application field of a flame retardant aromatic polycarbonate resin material is diversified, further improvement of flame retardancy is desired.

To improve flame retardancy, there is proposed a method in which flame retardancy is improved by adjusting the quality of a conventionally known flame retardant to a suitable range and not by changing the type of a flame retardant or increasing the amount of a flame retardant. For example, for an aromatic polycarbonate resin composition comprising a fluorine-containing organic metal salt compound typified by an alkali metal salt of a perfluoroalkylsulfonic acid, there is proposed (i) a method in which the pH of an aqueous solution or dispersion of the compound is adjusted to 5 to 9 (see Patent Document 3). Further, there is known (ii) a method in which the alcohol insoluble content of the compound is reduced (see Patent Document 4). However, these proposals are interesting in a sense that the factor of reducing flame retardancy is clarified but fail to clearly distinguish the above composition from commercially available fluorine-containing organic metal salt compounds. Although various additives are added to a polycarbonate resin for practical use in most cases, a method of achieving excellent flame retardancy without impairing an effect expected from the addition of the additives is not made clear. A manufacturing process in which the content of a fluoride ion in an alkali metal salt of a perfluoroalkylsulfonic acid is set to 1 ppm is known (see Patent Document 5). However, a combination of an alkali metal salt of a perfluoroalkylsulfonic acid obtained by the above manufacturing process and an aromatic polycarbonate resin is unknown.

| | |
|---|---|
| Patent Document 1 | JP-B 54-32456 |
| Patent Document 2 | JP-B 60-19335 |
| Patent Document 3 | JP-A 2001-31855 |
| Patent Document 4 | JP-A 2001-115004 |
| Patent Document 5 | JP-A 1-268671 |

DISCLOSURE OF THE INVENTION

Problems to Be Solved by the Invention

It is an object of the present invention to provide an aromatic polycarbonate resin composition having excellent flame retardancy. More specifically, it is an object of the present invention to improve the flame retardancy of an aromatic polycarbonate resin composition comprising a fluorine-containing organic metal salt compound and additives without impairing an effect expected from the addition of the additives as much as possible or while suppressing inconvenience caused by the addition of the additives as much as possible.

The inventors of the present invention have conducted intensive studies to attain the above object. As a result, they have found that when the content of a fluoride ion in the fluorine-containing organic metal salt compound to be added to the aromatic polycarbonate resin composition is reduced, the effect of preventing the dripping of the resin composition at the time of combustion is improved and other effects are also improved.

The amount of the fluorine-containing organic metal salt compound contained in the aromatic polycarbonate resin composition is less than 1 wt % and the content of the fluoride ion in the compound is less than 100 ppm. However, it is surprising that a trace amount of the fluoride ion contained in the resin composition has a great influence upon the flame retardancy and other characteristic properties of the resin composition.

The inventors have further proceeded with their intensive studies based on this finding and have accomplished the present invention.

Means for Solving the Problems

That is, the present invention is an aromatic polycarbonate resin composition comprising (1) 100 parts by weight of an aromatic polycarbonate resin (component A), (2) 0.005 to 0.6 part by weight of a fluorine-containing organic metal salt (component B) having a fluoride ion content measured by ion chromatography of 0.2 to 20 ppm in terms of weight, and (3) at least one component selected from the group consisting of a flame retardant other than the fluorine-containing organic metal salt (component C), a fatty acid ester (component D), an ultraviolet light absorber (component E), polytetrafluoroethylene having fibril formability (component F), a filler (component G), a silicate mineral (component H) and a titanium dioxide pigment (component I).

The present invention is a process for manufacturing an aromatic polycarbonate resin composition, comprising adding 0.005 to 0.6 part by weight of a fluorine-containing organic metal salt (component B) having a fluoride ion content measured by ion chromatography of 0.2 to 20 ppm in terms of weight and at least one component selected from the group consisting of the above components C to I to 100 parts by weight of an aromatic polycarbonate resin (component A).

The present invention includes an article molded out of the above resin composition.

The present invention includes a method of preventing the melt dripping of a resin composition comprising (A) an aromatic polycarbonate resin (component A), (2) a fluorine-containing organic metal salt and (3) at least one component selected from the group consisting of a flame retardant other than the fluorine-containing organic metal salt (component C), a fatty acid ester (component D), a ultraviolet light absorber (component E), polytetrafluoroethylene having fibril formability (component F), a filler (component G), a silicate mineral (component H) and a titanium dioxide pigment (component I) at the time of combustion, wherein a fluorine-containing organic metal salt having a fluoride ion content measured by ion chromatography of 0.2 to 20 ppm in terms of weight (component B) is used as the fluorine-containing organic metal salt (2) in an amount of 0.005 to 0.6 part by weight based on 100 parts by weight of the aromatic polycarbonate resin (component A).

Further, the present invention includes a flame retardant for aromatic polycarbonate resin, which is composed of a fluorine-containing organic metal salt having a fluoride ion content measured by ion chromatography of 0.2 to 20 ppm in terms of weight.

In addition, the present invention includes a master batch composed of the above flame retardant and an aromatic polycarbonate resin.

Effect of the Invention

The resin composition of the present invention has excellent flame retardancy and hardly melt drips at the time of combustion. The effect of improving flame retardancy is exhibited especially remarkably when the resin composition is used in combination with a silicone-based flame retardant. Excellent releasability, weatherability, hue, fatigue resistance and light reflection can be achieved when the resin composition is used in combination with various additives. According to the manufacturing process of the present invention, the resin composition can be manufactured. Further, according to the present invention, the melt dripping of the resin composition at the time of combustion can be prevented.

EXPLANATION OF REFERENCE NUMERALS

Figure 1:
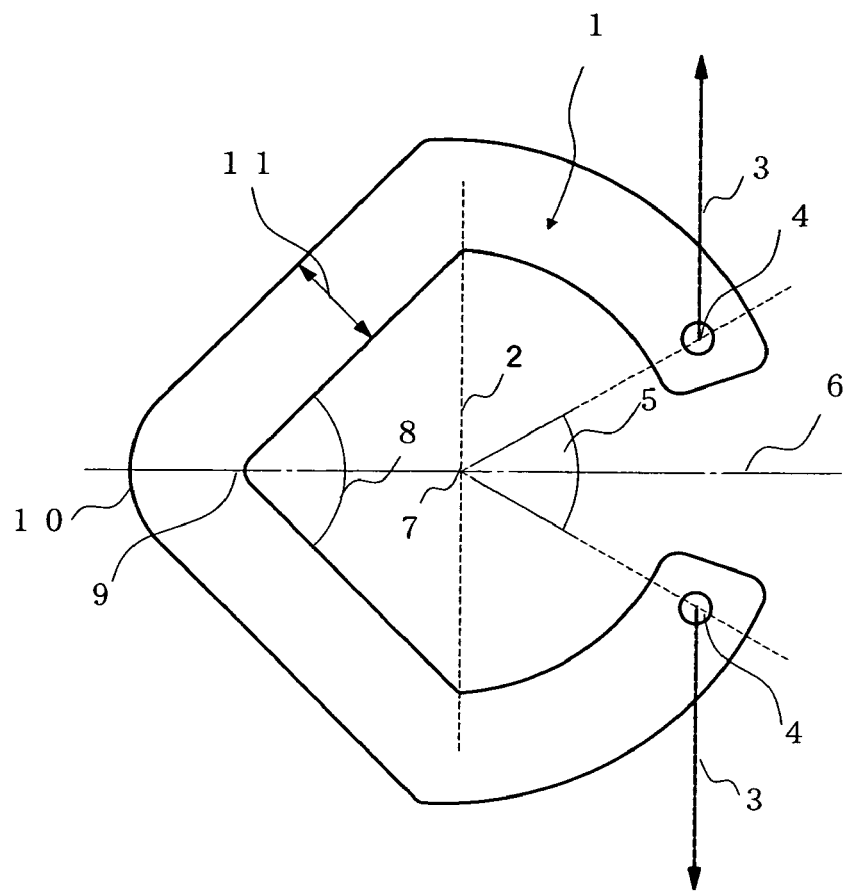
FIG. 1 is a front view of a C-shaped test sample used to evaluate fatigue resistance (the test sample has a thickness of 3 mm. The jigs of a tester are inserted into holes denoted by 4 and a test is carried out by applying a predetermined load in a vertical direction denoted by 3)

1 C-shaped test sample
2 Broken line indicating connection positions between a bent portion and arc portions
3 Direction of a load applied to a test sample during a fatigue test
4 Jig hole (circle having a diameter of 3 mm)
5 Center angle (600) showing the positions of jig holes with an intersection point denoted by 7 as the center thereof
6 axis of symmetry of a test sample (vertical symmetry)
7 Intersection point between the broken line 2 and the axis of symmetry 6
8 Angle (90°) of the bent portion
9 R surface on the inner side of the bent portion (R1.5: radius of 1.5 mm)
10 R surface on the outer side of the bent portion (R10: radius of 10 mm)
11 Width of the bent portion (10 mm)
21 molded product shaped like the housing for notebook type personal computer
22 frosted surface portion
23 mirror portion
24 gate (pin gate of 0.8 mmΦ, 5 gates)
25 weld line
26 cut-out portion for evaluation sample
27 boss with a rib (on the rear side of the mirror portion)
28 boss with a rib (on the rear side of the mirror portion)

BEST MODE FOR CARRYING OUT THE INVENTION (Component A: Aromatic Polycarbonate Resin)

The aromatic polycarbonate resin used as the component A in the present invention is obtained by reacting a divalent phenol with a carbonate precursor. Examples of the reaction method include interfacial polymerization method, melt ester interchange method, the solid-phase ester interchange method of a carbonate prepolymer, and the ring-opening polymerization method of a cyclic carbonate compound.

The aromatic polycarbonate resin may be a polycarbonate resin having high heat resistance or low water absorptivity obtained by polymerizing other divalent phenol, besides a generally used bisphenol A type polycarbonate. The polycarbonate resin may be manufactured by any process. In the case of interfacial polycondensation, a terminal capping agent such as a monovalent phenol is used. The polycarbonate resin may also be a branched polycarbonate resin obtained by polymerizing a trifunctional phenol, or a copolycarbonate obtained by copolymerizing an aliphatic dicarboxylic acid, an aromatic dicarboxylic acid or a divalent aliphatic or alicyclic alcohol. The aromatic polycarbonate resin which is formed from a homopolymer of bisphenol A is particularly preferred because it is excellent in impact resistance. A detailed description of the aromatic polycarbonate resin which can be used as the component A in the present invention is given in EP1288262, for example.

Aromatic polycarbonates disclosed by JP-A 2004-149745 may be used as the aromatic polycarbonate resin having high heat resistance or low water absorptivity obtained by polymerizing other divalent phenol. The aromatic polycarbonates may be used alone or in combination of two or more. They may be mixed with a generally used bisphenol A type polycarbonate before use.

Since the branched polycarbonate resin can further improve the dripping preventing ability of the aromatic polycarbonate resin composition of the present invention with the multiplication effect, its use is preferred. A polyfunctional aromatic compound having a functionality of 3 or more used in the branched polycarbonate resin may be a known compound from which a branched polycarbonate resin is derived, preferably a trisphenol, more preferably 1,1,1-tris(4-hydroxyphenyl)ethane or 1,1,1-tris(3,5-dimethyl-4-hydroxyphenyl)ethane, particularly preferably 1,1,1-tris(4-hydroxyphenyl)ethane.

A constituent unit derived from the polyfunctional aromatic compound in the branched polycarbonate resin accounts for preferably 0.03 to 1 mol %, more preferably 0.05 to 0.7 mol %, much more preferably 0.05 to 0.4 mol % based on 100 mol % of the total of the constituent unit derived from the divalent phenol and the constituent unit derived from the polyfunctional aromatic compound. The branched structure unit may be derived not only from the polyfunctional aromatic compound but also be derived without using the polyfunctional aromatic compound such as a side reaction at the time of a melt ester interchange reaction. The amount of the branched structure can be calculated by $^1$H-NMR.

An interfacial polymerization reaction is generally a reaction between a divalent phenol and phosgene in the presence of an acid binder and an organic solvent. Examples of the acid binder include alkali metal hydroxides such as sodium hydroxide and potassium hydroxide, and pyridine.

Examples of the organic solvent include halogenated hydrocarbons such as methylene chloride and chlorobenzene.

A catalyst such as a tertiary amine or a quaternary ammonium salt may be used to promote the reaction. A monofunctional phenol such as phenol, p-tert-butylphenol or p-cumylphenol is preferably used as a molecular weight modifier. Further, use of a monofunctional phenol having a relatively long-chain alkyl group such as decylphenol or dodecylphenol is effective when the improvement of flowability and hydrolysis resistance is desired.

The reaction temperature is generally 0 to 40° C., the reaction time is several minutes to 5 hours, and pH during the reaction is preferably maintained at 10 or more.

The melt ester interchange reaction is generally an ester interchange reaction between a divalent phenol and a carbonic acid diester. The divalent phenol and the carbonic acid diester are mixed together in the presence of an inert gas and reacted with each other at 120 to 350° C. under reduced pressure. The degree of pressure to be reduced to be reduced is changed stepwise and finally set to 133 Pa or less to remove the formed phenols to the outside of the system. The reaction time is generally about 1 to 4 hours. An aromatic polycarbonate resin obtained by melt ester interchange method is disclosed in detail by EP1038920, for example.

Details of reactions other than the above reaction are well known from various documents and patent publications.

To manufacture the aromatic polycarbonate resin composition of the present invention, the viscosity average molecular weight (M) of the aromatic polycarbonate resin is not particularly limited but preferably 10,000 to 50,000, more preferably 14,000 to 30,000, much more preferably 14,000 to 24,000.

Since expected impact resistance for practical application may not be obtained and satisfactory dripping prevention ability is not obtained from an aromatic polycarbonate resin having a viscosity average molecular weight of less than 10,000, flame retardancy tends to be poor. A resin composition obtained from an aromatic polycarbonate resin having a viscosity average molecular weight higher than 50,000 deteriorates in general applicability because it has poor flowability at the time of injection molding.

The above aromatic polycarbonate resin may be obtained by mixing an aromatic polycarbonate resin having a viscosity average molecular weight outside the above range. An aromatic polycarbonate resin having a viscosity average molecular weight higher than the above range (50,000) can further improve the dripping prevention ability of the resin composition of the present invention with the multiplication effect due to the improvement of the entropy elasticity of the resin. This improving effect is better than that of the above branched polycarbonate. More preferred is an aromatic polycarbonate resin (component A-3) having a viscosity average molecular weight of 16,000 to 35,000 which comprises an aromatic polycarbonate resin having a viscosity average molecular weight of 70,000 to 2,000,000 (component A-3-1) and an aromatic polycarbonate resin having a viscosity average molecular weight of 10,000 to 30,000 (component A-3-2).

In the above component A-3, the molecular weight of the component A-3-1 is preferably 70,000 to 200,000, more preferably 100,000 to 160,000. The molecular weight of the component A-3-2 is preferably 10,000 to 25,000, more preferably 12,000 to 23,000.

The component A-3 can be obtained by mixing together the above components A-3-1 and A-3-2 in a specific ratio to achieve a predetermined molecular weight. Preferably, the amount of the component A-3-1 is preferably 2 to 40 wt %, more preferably 3 to 30 wt %, much more preferably 4 to 20 wt %, particularly preferably 5 to 20 wt % based on 100 wt % of the component A-3. The molecular weight distribution of the polycarbonate resin is in the range of 2 to 3. Therefore, the components A-3-1 and A-3-2 of the present invention preferably satisfy the above range of the molecular weight distribution. The molecular weight distribution is represented by the (Mw/Mn) ratio of the weight average molecular weight (Mw) to the number average molecular weight (Mn) measured by GPC (gel permeation chromatography). Mn and Mw are in terms of standard polystyrene.

The component A-3 is prepared in accordance with a known method, for example, the method of preparing a polycarbonate resin containing a high molecular weight component disclosed by JP-A 2003-82218.

The term "viscosity average molecular weight" as used herein is obtained as follows. First, a specific viscosity ($\eta_{sp}$) calculated from the following equation is obtained from a solution containing 0.7 g of an aromatic polycarbonate dissolved in 100 ml of methylene chloride at 20° C. by using an Ostwald's viscometer, and a viscosity average molecular weight M is calculated from the obtained specific viscosity ($\eta_{sp}$) based on the following equation.

Specific viscosity $(\eta_{sp})=(t-t_0)/t_0$

[$t_0$ is the number of seconds during which methylene chloride drops and t is the number of seconds during which the sample solution drops]

$\eta_{sp}/c=[\eta]+0.45\times[\eta]^2 c$ ([$\eta$] is an intrinsic viscosity)

$[\eta]=1.23\times10^{-4}M^{0.83}$ $c=0.7$

The calculation of the viscosity average molecular weight of the resin composition of the present invention is carried out as follows. That is, the composition is mixed with methylene chloride in a weight ratio of 1:20 to 1:30 to dissolve soluble matter contained in the composition. The soluble matter is sampled by cerite filtration. Thereafter, the solvent is removed from the obtained solution. The solid obtained after the removal of the solvent is fully dried to obtain a solid component which dissolves in methylene chloride. The specific viscosity at 20° C. is obtained as described above from the solution containing 0.7 g of the above solid component dissolved in 100 ml of methylene chloride and the viscosity average molecular weight M is calculated from the specific viscosity as described above.

(Component B: Fluorine-Containing Organic Metal Salt)

The component B in the present invention is a fluorine-containing organic metal salt having a fluoride ion ($F^-$) content measured by ion chromatography of 0.2 to 20 ppm, preferably 0.2 to 10 ppm, more preferably 0.2 to 5 ppm.

The fluorine-containing organic metal salt in the present invention is a metal salt consisting of an anion component composed of an organic acid having a fluorine-substituted hydrocarbon group and a cation component composed of a metal ion. Preferred examples of the fluorine-containing organic metal salt include metal salts of a fluorine-substituted organic sulfonic acid, metal salts of a fluorine-substituted organic sulfuric acid ester and metal salts of a fluorine-substituted organic phosphoric acid ester. The fluorine-containing organic metal salts may be used alone or in combination of two or more. Out of these, metal salts of a fluorine-substituted organic sulfonic acid are preferred, and metal salts of sulfonic acid having a perfluoroalkyl group are particularly preferred. The number of carbon atoms of the perfluoroalkyl group is preferably 1 to 18, more preferably 1 to 10, much more preferably 1 to 8.

The metal constituting the fluorine-containing organic metal salt is an alkali metal or an alkali earth metal. Examples of the alkali metal include lithium, sodium, potassium, rubidium and cesium, and examples of the alkali earth metal include beryllium, magnesium, calcium, strontium and barium. Alkali metals are more preferred.

Therefore, the preferred component B of the present invention is an alkali metal salt of a perfluoroalkylsulfonic acid. Out of the above alkali metals, rubidium and cesium are preferred when higher transparency is desired. However, they are not generally applicable and are hardly purified, whereby they may be disadvantageous from the economical point of view. A potassium salt of a perfluoroalkylsulfonic acid is most preferred because it is excellent in balance between transparency and flame retardancy. A potassium salt of a perfluoroalkylsulfonic acid and another alkali metal salt of a perfluoroalkylsulfonic acid may be used in combination.

Examples of the component B, particularly preferred alkali metal salts of a perfluoroalkylsulfonic acid include potassium trifluoromethanesulfonate, potassium perfluorobutanesulfonate, potassium perfluorohexanesulfonate, potassium perfluorooctanesulfonate, sodium pentafluoroethanesulfonate, sodium perfluorobutanesulfonate, sodium perfluorooctanesulfonate, lithium trifluoromethanesulfonate, lithium perfluorobutanesulfonate, lithium perfluoroheptanesulfonate, cesium trifluoromethanesulfonate, cesium perfluorobutanesulfonate, cesium perfluorooctanesulfonate, cesium perfluorohexanesulfonate, rubidium perfluorobutanesulfonate and rubidium perfluorohexanesulfonate. They may be used alone or in combination of two or more. Out of these, potassium perfluorobutanesulfonate is particularly preferred.

(Content of Fluoride Ion)

The content of the fluoride ion measured by ion chromatography in the present invention is a value measured by the following method.

That is, an accurately weighed fluorine-containing organic metal salt sample is dissolved in super pure water (for reagents) to prepare a 0.2 wt % aqueous solution. After the sample is completely dissolved, the aqueous solution is filtered (for example by using the OnGuard-H cartridge of DIONEX Co., Ltd.), and a predetermined amount of the filtered aqueous solution is collected as a measurement solution.

The measurement solution is measured by using an ion chromatograph. This measurement is carried out by using for example the DX-100 ion chromatograph of DIONEX Co., Ltd., the ASA-SC column for anion analysis, an electric conductivity meter as a detector and a mixed aqueous solution of 1.8 mmol of $Na_2CO_3$ and 1.7 mmol of $NaHCO_3$ dissolved in 1 liter of pure water as an eluate at an eluate flow rate of 1.5 ml/min.

The content of the fluoride ion in the sample can be obtained based on the obtained strength of the fluoride ion, whereby the content of the fluoride ion in the component B of the present invention is calculated. Although the concentration of the aqueous solution prepared herein is 0.2 wt %, it may be suitably changed according to the type of the fluorine-containing organic metal salt and the amount of the fluoride ion.

As for the content of the fluoride ion in the aromatic polycarbonate resin composition, a predetermined amount of the sample is dissolved in methylene chloride, a predetermined amount of super pure water is added to and mixed with the resulting solution under agitation, standing and separation operations are carried out, the obtained water layer is filtered with the OnGuard-H cartridge of DIONEX Co., Ltd., and a predetermined amount of the filtered layer is extracted as a measurement solution.

(Process of Manufacturing Component B)

The component B can be manufactured by the following steps:

(i) obtaining a solution containing an alkali metal salt of a perfluoroalkylsulfonic acid and ion exchange water by neutralizing a perfluoroalkylsulfonic acid or perfluoroalkylsulfonyl fluoride with a carbonate or hydroxide of an alkali metal, (ii) obtaining a precipitate by cooling the solution (iii) separating the precipitate, (iii) washing the separated precipitate with ion exchange water, and (iv) drying the washed product.

(Step (i))

This is the step of obtaining a solution containing an alkali metal salt of a perfluoroalkylsulfonic acid and ion exchange water.

The alkali metal salt of a perfluoroalkylsulfonic acid is obtained by (a) neutralizing a perfluoroalkylsulfonic acid with a carbonate or hydroxide of an alkali metal or (b) neutralizing perfluoroalkylsulfonyl fluoride with a carbonate or hydroxide of an alkali metal. (b) is preferred.

Ion exchange water has a resistivity of preferably 16 MΩ·cm or more, particularly preferably 18 MΩ·cm or more. Therefore, ion exchange water having an electric conductivity of preferably 0.625 µS/cm or less, more preferably 0.555 µS/cm or less equivalent to the above resistivity is used.

The solution can be obtained by dissolving the alkali metal salt of a perfluoroalkylsulfonic acid in ion exchange water. More specifically, the alkali metal salt of a perfluoroalkylsulfonic acid is dissolved in ion exchange water in a weight ratio of 1:2 to 1:10 at preferably 40 to 90° C., more preferably 60 to 85° C. to obtain the solution. The solution is stirred at the above temperature for preferably 0.05 to 3 hours, more preferably 0.1 to 2 hours.

Alternatively, the solution can be prepared by adding perfluoroalkylsulfonyl fluoride to ion exchange water containing a carbonate or hydroxide of an alkali metal and carrying out a neutralization reaction in the ion exchange water.

(Cooling Step (ii))

This is the step of cooling the solution to obtain a precipitate. The solution is cooled at preferably 0 to 40° C., more preferably 10 to 35° C. Crystals are precipitated by cooling.

(Separation Step (iii))

This is the step of obtaining the precipitate through solid-liquid separation. The solid-liquid separation can be carried out by a commonly used method such as filtration or centrifugation.

(Washing Step (iv))

This is the step of washing the separated precipitate with ion exchange water. The ion exchange water has an electric conductivity of preferably 0.625 μS/cm or less, more preferably 0.555 μS/cm or less. More preferably, the precipitate is washed with a polar solvent such as an alcohol.

(Drying Step (v))

Thereafter, the purified perfluoroalkylsulfonic acid alkali metal salt can be obtained by drying the washed product.

The amount of the component B in the present invention is 0.005 to 0.6 part by weight, preferably 0.005 to 0.2 part by weight, more preferably 0.008 to 0.13 part by weight based on 100 parts by weight of the aromatic polycarbonate resin as the component A. More excellent flame retardancy is obtained and a more transparent material can be provided as the amount of the component B becomes more preferred.

(Component C: Flame Retardant)

The resin composition of the present invention may contain a flame retardant (component C) other than the fluorine-containing organic metal salt. When the resin composition contains the component C, flame retardancy is improved by the multiplication effect of the components B and C.

Examples of the flame retardant include (i) halogen-based flame retardants (such as brominated epoxy resins, brominated polystyrenes, brominated polycarbonates (including oligomers), brominated polyacrylates and chlorinated polyethylenes), (ii) organic phosphorus-based flame retardants (such as monophosphate compounds, phosphate oligomer compounds, phosphonate oligomer compounds, phosphonitrile oligomer compounds and phosphonic acid amide compounds), (iii) organic metal salt-based flame retardants (such as organic sulfonic acid alkali (earth) metal salts other than the fluorine-containing organic metal salts, boric acid metal salt-based flame retardants and stannic acid metal salt-based flame retardants), and (vi) silicone-based flame retardants composed of silicone compounds.

Out of these, at least one compound selected from the group consisting of a phosphate compound (component C-1), silicone compound (component C-2) and brominated polycarbonate (including an oligomer) (component C-3) is preferably used in combination with the component B. Particularly a silicon-based flame retardant exhibits a remarkable effect obtained by blending the component B of the present invention. The silicone-based flame retardant has a small environmental load, and a more preferred silicone-based flame retardant is excellent in transparency and color when it is added to a polycarbonate resin.

(Component C-1: Phosphate Compound)

Although phosphate compounds which are conventionally known as flame retardants may be used as the phosphate compound (component C-1), at least one phosphate compound represented by the following general formula (i) is more preferred.

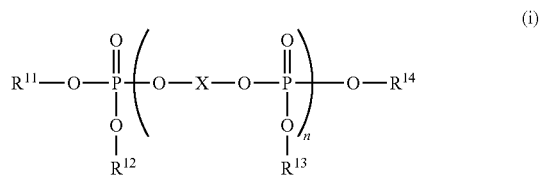

wherein X is a divalent organic group derived from a divalent phenol, $R^{11}$, $R^{12}$, $R^{13}$ and $R^{14}$ are each a monovalent organic group derived from a monovalent phenol, and n is an integer of 0 to 5.

The phosphate compound of the above formula may be a mixture of compounds which differs in "n". In the case of a mixture, the average value of "n" is preferably 0.5 to 1.5, more preferably 0.8 to 1.2, much more preferably 0.95 to 1.15, particularly preferably 1 to 1.14. The acid value of the phosphate compound is preferably 1 or less, more preferably 0.2 or less, much more preferably 0.1 or less.

Preferred examples of the divalent phenol from which the above X is derived include hydroquinone, resorcinol, bis(4-hydroxydiphenyl)methane, bisphenol A, dihydroxydiphenyl, dihydroxynaphthalene, bis(4-hydroxyphenyl)sulfone, bis(4-hydroxyphenyl)ketone and bis(4-hydroxyphenyl) sulfide. Out of these, resorcinol, bisphenol A and dihydroxydiphenyl are preferred.

Preferred examples of the monovalent phenol from which the above $R^{11}$, $R^{12}$, $R^{13}$ and $R^{14}$ are derived include phenol, cresol, xylenol, isopropylphenol, butylphenol and p-cumylphenol. Out of these, phenol and 2,6-dimethylphenol are preferred.

Examples of the phosphate compound substituted by a halogen atom include tris(2,4,6-tribromophenyl)phosphate, tris(2,4-dibromophenyl)phosphate and tris(4-bromophenyl) phosphate. The phosphate compound substituted by a halogen atom which can be used as the component C-1 is described in detail in JP-A 06-263977.

Component C-2: Silicone Compound)

The silicone compound (component C-2) improves flame retardancy by a chemical reaction at the time of combustion. As the compound may be used various compounds which have been proposed as flame retardants for aromatic polycarbonate resins.

It is considered that the silicone compound provides a flame retarding effect to a polycarbonate resin as it is bonded itself or bonded to a component derived from the resin to form a structure at the time of combustion or due to a reduction reaction at the time of forming the structure. Therefore, it is preferred that the compound should have a highly active group for the reaction.

More preferably, the silicone compound contains a predetermined amount of at least one group selected from an alkoxy group and hydrogen (that is, Si—H group). The amount of the group (alkoxy group or Si—H group) is 0.1 to 1.2 mol/100 g, more preferably 0.12 to 1 mol/100 g, much more preferably 0.15 to 0.6 mol/100 g. This amount is obtained by measuring the amount of hydrogen or alcohol formed per unit weight of the silicon compound by an alkali decomposition method. The alkoxy group is preferably an alkoxy group having 1 to 4 carbon atoms, particularly preferably a methoxy group.

In general, the structure of the silicone compound is constituted by combining the following four siloxane units arbitrarily.

M unit: monofunctional siloxane unit such as $(CH_3)_3SiO_{1/2}$, $H(CH_3)_2SiO_{1/2}$, $H_2(CH_3)SiO_{1/2}$, $(CH_3)_2(CH_2=CH)SiO_{1/2}$, $(CH_3)_2(C_6H_5)SiO_{1/2}$ or $(CH_3)(C_6H_5)(CH_2=CH)SiO_{1/2}$ D unit: bifunctional siloxane unit such as $(CH_3)_2SiO$, $H(CH_3)SiO$, $H_2SiO$, $H(C_6H_5)SiO$, $(CH_3)(CH_2=CH)SiO$ or $(C_6H_5)_2SiO$ T unit: trifunctional siloxane unit such as $(CH_3)SiO_{3/2}$, $(C_3H_7)SiO_{3/2}$, $HSiO_{3/2}$, $(CH_2=CH)SiO_{3/2}$ or $(C_6H_5)SiO_{3/2}$ Q unit: tetrafunctional siloxane unit represented by $SiO_2$ The structure of the silicone compound (component C-2) is represented by $D_n$, $T_p$, $M_mD_n$, $M_mT_p$, $M_mQ_q$, $M_mD_nT_p$, $M_mD_nQ_q$, $M_mT_pQ_q$, $M_mD_nT_pQ_q$, $D_nT_p$, $D_nQ_q$ or $D_nT_pQ_q$. Out of these, the structure of the silicone compound is represented by preferably $M_mD_n$, $M_mT_p$, $M_mD_nT_p$ or $M_mD_nQ_q$, more preferably $M_mD_n$ or $M_mD_nT_p$.

The coefficients m, n, p and q in the above formulas are each an integer of 1 or more which indicates the degree of polymerization of each siloxane unit. The total of the above coefficients is the average degree of polymerization of the silicone compound. This average degree of polymerization is in the range of preferably 3 to 150, more preferably 3 to 80, much more preferably 3 to 60, particularly preferably 4 to 40. The flame retardancy of the silicone compound becomes more excellent as the above average degree of polymerization becomes more preferred. As will be described hereinafter, the silicone compound containing a predetermined amount of an aromatic group is also excellent in transparency. When either one of m, n, p and q is 2 or more, the number of the siloxane units having the coefficient may be two or more which differ in the bonded hydrogen atom or organic residue.

Further, the component C-2 may have a linear or branched structure. The organic residue bonded to the silicon atom has preferably 1 to 30, more preferably 1 to 20 carbon atoms. Examples of the organic residue include alkyl groups such as methyl group, ethyl group, propyl group, butyl group, hexyl group and decyl group, cycloalkyl groups such as cyclohexyl group, aryl groups such as phenyl group, and aralkyl groups such as tolyl group. It is preferably an alkyl group having 1 to 8 carbon atoms, alkenyl group or aryl group. The alkyl group is particularly preferably an alkyl group having 1 to 4 carbon atoms such as methyl group, ethyl group and propyl group.

The component C-2 preferably contains an aryl group because an aromatic polycarbonate resin composition having flame retardancy and more excellent transparency can be provided. The amount of the aromatic group represented by the following general formula (ii) is preferably 10 to 70 wt % (more preferably 15 to 60 wt %).

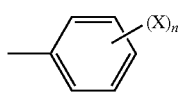
(ii)

wherein each X is independently an OH group or monovalent organic residue having 1 to 20 carbon atoms, and n is integer of 0 to 5, with the proviso that when n is 2 or more, X's may be different.

The component C-2 of the present invention may contain a reactive group other than the above Si—H group and alkoxy group, and examples of the reactive group include amino group, carboxyl group, epoxy group, vinyl group, mercapto group and methacryloxy group.

As the component C-2 of the present invention, the silicone compound having an Si—H group is preferably a silicone compound having at least one of structural units represented by the following general formulas (iii) and (iv).

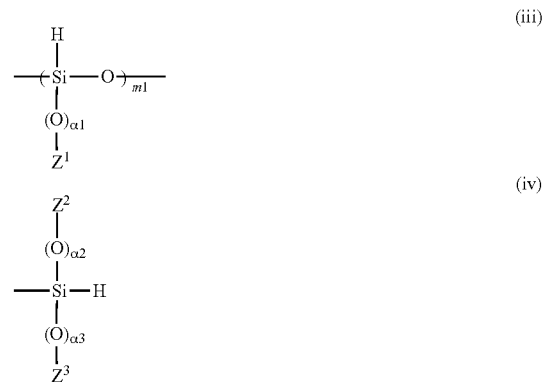

In the formulas (iii) and (iv), $Z^1$ to $Z^3$ are each independently a hydrogen atom, monovalent organic residue having 1 to 20 carbon atoms, or a compound represented by the following general formula (v), $\alpha 1$ to $\alpha 3$ are each independently 0 or 1, and m1 is 0 or an integer of 1 or more, with the proviso that when m1 is 2 or more in the formula (iii), the recurring units may be different from each other.

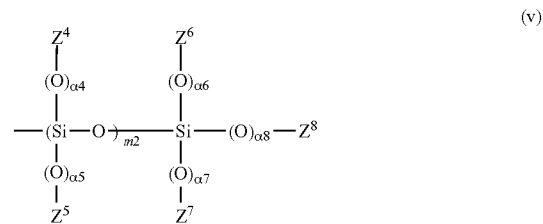

In the formula (v), $Z^4$ to $Z^8$ are each independently a hydrogen atom or monovalent organic residue having 1 to 20 carbon atoms, $\alpha 4$ to $\alpha 8$ are each independently 0 or 1, and m2 is 0 or an integer of 1 or more, with the proviso that when m2 is 2 or more in the formula (v), the recurring units may be different from each other.

As the component C-2, the silicone compound having an alkoxy group is at least one compound selected from the group consisting of compounds represented by the following general formulas (vi) and (vii).

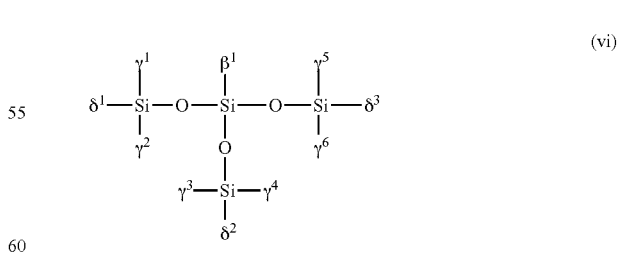

In the formula (vi), $\beta^1$ is a vinyl group, alkyl group having 1 to 6 carbon atoms, cycloalkyl group having 3 to 6 carbon atoms, or aryl group or aralkyl group having 6 to 12 carbon atoms, and $\gamma^1$, $\gamma^2$, $\gamma^3$, $\gamma^4$, $\gamma^5$ and $\gamma^6$ are each an alkyl group or cycloalkyl group having 1 to 6 carbon atoms, or aryl group or aralkyl group having 6 to 12 carbon atoms, with proviso that at least one of the groups is an aryl group or aralkyl group, and $\delta^1$, $\delta^2$ and $\delta^3$ are each an alkoxy group having 1 to carbon atoms.

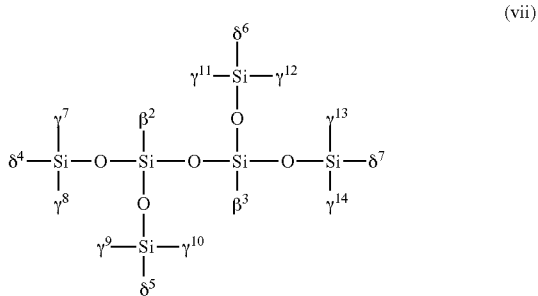

(vii)

In the formula (vii), $\beta^2$ and $\beta^3$ are each a vinyl group, alkyl group having 1 to 6 carbon atoms, cycloalkyl group having 3 to 6 carbon atoms, or aryl group or aralkyl group having 6 to 12 carbon atoms, $\gamma^7, \gamma^8, \gamma^9, \gamma^{10}, \gamma^{11}, \gamma^{12}, \gamma^{13}$ and $\gamma^{14}$ are each an alkyl group having 1 to 6 carbon atoms, cycloalkyl group having 3 to 6 carbon atoms, or aryl group or aralkyl group having 6 to 12 carbon atoms, with proviso that at least one of the groups is an aryl group or aralkyl group, and $\delta^4, \delta^5, \delta^6$ and $\delta^7$ are each an alkoxy group having 1 to 4 carbon atoms.

(Component C-3: Brominated Polycarbonate)

The brominated polycarbonate (component C-3) is a brominated polycarbonate compound comprising a structural unit represented by the following general formula (viii) in an amount of at least 60 mol %, preferably at least 80 mol % of the total of all the structural units, particularly preferably a brominated polycarbonate compound substantially composed of a recurring unit represented by the following general formula (viii).

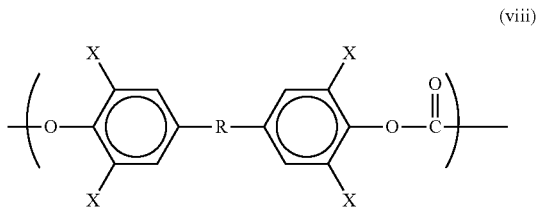

(viii)

In the formula (viii), X is a bromine atom, and R is an alkylene group having 1 to 4 carbon atoms, alkylidene group having 1 to 4 carbon atoms or $-SO_2-$.

In the formula (viii), R is preferably a methylene group, ethylene group or isopropylidene group, $-SO_2-$ particularly preferably an isopropylidene group.

Preferably, the brominated polycarbonate as the component C-3 has a terminal chlorine content of 0.3 ppm or less, a terminal hydroxyl group content of 0.0005 mol or less and a specific viscosity of 0.015 to 0.1. This preferred brominated polycarbonate compound is described in detail in JP-A 2000-297147.

The amounts of the components C-1 to C-3 are preferably 0.01 to 5 parts by weight, more preferably 0.05 to 3 parts by weight, much more preferably 0.08 to 2 parts by weight based on 100 parts by weight of the component A. A resin composition having an excellent multiplication effect of the component B and the component C, that is, excellent flame retardancy is provided when the amount of the component C is in the above preferred range.

Other preferred organic metal salt-based flame retardants include alkali (earth) metal salts of an aliphatic sulfonic acid containing no fluorine atom, alkali (earth) metal salts of an aromatic sulfonic acid, alkali (earth) metal salts of a sulfuric acid ester, and alkali (earth) metal salts of an aromatic sulfonamide. The term "alkali (earth) metal salts" means both alkali metal salts and alkali earth metal salts. As the metal salts may be used known flame retardants for polycarbonate resins, whose examples are disclosed by EP1288262.

Preferably alkali (earth) metal salts of an aromatic sulfonic acid, particularly preferably potassium sales of an aromatic sulfonic acid are used in combination with the component B of the present invention. Potassium diphenylsulfone-3-sulfonate and dipotassium diphenylsulfone-3,3'-disulfonate are particularly preferred. When an alkali (earth) metal salt of an aromatic sulfonic acid is added, its amount is preferably 0.001 to 1 part by weight, more preferably 0.005 to 0.5 part by weight based on 100 parts by weight of the component A.

(Component D: Fatty Acid Ester)

The resin composition of the present invention may optionally contain a fatty acid ester (component D) as a release agent. Even when the resin composition of the present invention contains a fatty acid ester which tends to exert a bad influence upon flame retardancy, excellent flame retardancy is obtained by the function of the component B.

The fatty acid ester (component D) is an ester of an aliphatic alcohol and an aliphatic carboxylic acid. The aliphatic alcohol may be a monohydric alcohol or a polyhydric alcohol having a valence of 2 or more. The number of carbon atoms of the alcohol is 3 to 32, preferably 5 to 30. Examples of the monohydric alcohol include linear aliphatic monohydric alcohols such as octadecanol and ceryl alcohol, and branched aliphatic monohydric alcohols such as Guerbet Alcohols. Examples of the polyhydric alcohol include pentaerythritol, dipentaerythritol and polyglycerols (triglycerol to hexaglycerol). The polyhydric alcohol is preferred in the fatty acid ester of the present invention.

Preferably, the aliphatic carboxylic acid has 3 to 32 carbon atoms. Aliphatic carboxylic acids having 10 to 22 carbon atoms are particularly preferred. The aliphatic carboxylic acids include saturated aliphatic carboxylic acids such as decanoic acid, undecanoic acid, dodecanoic acid, tridecanoic acid, tetradecanoic acid, pentadecanoic acid, hexadecanoic acid (palmitic acid), heptadecanoic acid, octadecanoic acid (stearic acid), nonadecanoic acid, icosanonic acid and docosanic acid, and unsaturated aliphatic carboxylic acids such as palmitoleic acid, oleic acid, linoleic acid, linolenic acid, eicosanoic acid, eicosapentaenoic acid and cetoleic acid. Out of these, aliphatic carboxylic acids having 14 to 20 carbon atoms are preferred. Saturated aliphatic carboxylic acids are more preferred. Stearic acid and palmitic acid are particularly preferred.

The aliphatic carboxylic acid may be a mixture of carboxylic acid components which differ in the number of carbon atoms manufactured from natural oils and fats such as animal oils and fats (such as beef tallow and lard) and vegetable oils and fats (such as palm oil), or a single compound. A mixture is preferably used, and stearic acid or palmitic acid is preferably used as the main component of the mixture.

The fatty acid ester may be a partial ester or a full ester. Since the partial ester has generally a large hydroxyl value and easily triggers the decomposition of a resin at a high temperature, the full ester is preferred.

The acid value of the component D is preferably 20 or less (can be 0 substantially). The hydroxyl value of the component D is preferably 0.1 to 30. Further, the iodine value of the component D is preferably 10 or less (can be 0 substantially). These properties can be obtained by methods specified in JIS K0070.

The amount of the component D is 0.005 to 2 parts by weight, preferably 0.01 to 1 part by weight, more preferably 0.05 to 0.5 part by weight based on 100 parts by weight of the component A. Within the above range, the resin composition has excellent releasability, flame retardancy and transparency.

In the present invention, polyolefin-based waxes which may be modified by a functional group such as an acid, such as polyethylene wax and 1-alkene polymer, fluorine compounds such as fluorine oil typified by polyfluoroalkyl ether, paraffin wax and beeswax may be used as other release agents. The amount of the release agent is preferably 0.005 to 2 parts by weight based on 100 parts by weight of the aromatic polycarbonate resin (component A).

(Component E: Ultraviolet Light Absorber)

The resin composition of the present invention may contain an ultraviolet light absorber (component E). In the present invention, when the components B and E are used in combination, excellent weatherability can be provided while characteristic properties are provided to the resin composition by the component B. Therefore, the resin composition is hardly yellowed by ultraviolet light.

Heretofore, it has been difficult to change the components of the resin composition in most cases as the aromatic polycarbonate resin composition comprising a fluorine-containing organic metal salt is based on balance among various properties. Therefore, when an ultraviolet light absorber is added to provide light resistance, there is a case where other characteristic properties such as mechanical properties, transparency, hue or heat stability must be sacrificed. However, the present invention has an advantage that the improvement of light resistance can be obtained by using a conventionally known ultraviolet light absorber in the same amount as in the prior art.

The resin composition containing components A, B and E of the present invention is extremely useful in industrial fields such as OA equipment and electric and electronic appliances.

The ultraviolet light absorber (component E) is selected from a conventionally known benzophenone-based compound, benzotriazole-based compound, hydroxyphenyltriazine-based compound, cyclic iminoester-based compound and cyanoacrylate-based compound. Specific examples of the ultraviolet light absorber include 2,2'-dihydroxy-4-methoxybenzophenone, 2-(2H-benzotriazol-2-yl)-p-cresol, 2-(2H-benzotriazol-2-yl)-4-(1,1,3,3-tetramethylbutyl) phenol, 2-(2H-benzotriazol-2-yl)-4,6-bis(1-methyl-1-phenylethyl) phenol, 2-[5-chloro(2H)-benzotriazol-2-yl]-4-methyl-6-tert-butyl phenol, 2,2'-methylenebis[6-(2H-benzotriazol-2-yl)-4-(1,1,3,3-tetramethylbutyl)phenol], 2-(4,6-diphenyl-1,3,5-triazin-2-yl)-5-[(hexyl)oxy]phenol, 2,2'-p-phenylenebis(3,1-benzooxazin-4-one) and 1,3-bis[[(2-cyano-3,3-diphenylacryloyl)oxy]-2,2-bis[[(2-cyano-3,3-diphenylacryloyl)oxy]methyl]propane. Further, hindered amine-based optical stabilizers such as bis(2,2,6,6-tetramethyl-4-piperidyl)sebacate and bis(1,2,2,6,6-pentamethyl-4-piperidyl)sebacate may also be used.

Further, the above ultraviolet light absorber may be a polymer type ultraviolet light absorber obtained by copolymerizing an ultraviolet light absorbing monomer and/or an optical stabilizing monomer with a monomer such as an alkyl (meth) acrylate when it has the structure of a monomer compound which can be radically polymerized. Preferred examples of the ultraviolet light absorbing monomer include compounds having a benzophenone skeleton, benzotriazole skeleton, benzophenone skeleton, triazine skeleton, cyclic iminoester skeleton and cyano acrylate skeleton in the ester substituent of a (meth)acrylic ester.

Out of these, benzotriazole-based compounds are preferred from the viewpoint of ultraviolet light absorptivity, and cyclic iminoester-based compounds are preferred from the viewpoints of heat resistance and hue (transparency). The above ultraviolet light absorbers may be used alone or in combination of two or more.

The amount of the ultraviolet light absorber is 0.01 to 7 parts by weight, preferably 0.02 to 2 parts by weight, more preferably 0.03 to 1 part by weight, particularly preferably 0.05 to 0.5 part by weight based on 100 parts by weight of the aromatic polycarbonate resin (component A).

(Component F: Polytetrafluoroethylene Having Fibril Formability)

The resin composition of the present invention may contain polytetrafluoroethylene having fibril formability (component F).

In this resin composition, the component B has the effect of reducing inconvenience such as the cohesion of the component F and color shade caused thereby.

In general, the degree of color shade of a resin composition can be reduced by adding a filler having a relatively high screening effect. When this filler is added, it may exert a bad influence upon other important characteristic properties such as flame retardancy and mechanical strength in most cases. According to the present invention, the above problem is solved by the component B, whereby inconvenience caused by the addition of other components is avoided. Particularly in a composition comprising a titanium dioxide pigment, the color shade of a molded product at the time of molding can be improved without changing basically its composition.

The resin composition comprising the components A, B and F of the present invention is extremely useful in industrial fields such as OA equipment and electric and electronic appliances.

Polytetrafluoroethylene (fibrillated PTFE) having fibril formability as the component F has a very high molecular weight and tends to be bonded to other PTFE's by an external function such as shear force to become fibrous. The number average molecular weight of the polytetrafluoroethylene is 1,500,000 to several tens of million. The lower limit is preferably 3,000,000. The number average molecular weight is calculated based on the melt viscosity of polytetrafluoroethylene at 380° C. as disclosed by JP-A 6-145520. That is, the fibrillated PTFE has a melt viscosity measured at 380° C. by the method disclosed by the above publication of $10^7$ to $10^{13}$ poise, preferably $10^8$ to $10^{12}$ poise.

PTFE in a solid form or aqueous dispersion form may be used. A mixture of PTFE having fibril formability and another resin may be used to improve dispersibility in a resin and obtain higher flame retardancy and mechanical properties. As disclosed by JP-A 6-145520, PTFE having a structure that its core is made of fibrillated PTFE and its shell is made of polytetrafluoroethylene having a low molecular weight is also preferably used. Solid PTFE is more preferred.

A fibrillated PTFE mixture may be obtained by any known method. Commercially available products of the fibrillated PTFE mixture include the Metabrene A3800 (trade name) of Mitsubishi Rayon Co., Ltd. and the BLENDEX B449 (trade name) of GE Specialty Chemicals Co., Ltd.

The content of the fibrillated PTFE in the mixture is preferably 10 to 80 wt %, more preferably 20 to 70 wt % based on 100 wt % of the mixture. Within the above range, the high dispersibility of the fibrillated PTFE and the suppression of a bad influence by the another resin in the mixture can be attained.

The content of the fibrillated PTFE (component F) in the aromatic polycarbonate resin composition is preferably 0.001 to 1 part by weight, more preferably 0.05 to 0.7 part by weight, more preferably 0.1 to 0.5 part by weight based on 100 parts by weight of the component A.

(Component G: Filler)

The resin composition of the present invention may contain a filler (component G). The filler is preferably at least one selected from the group consisting of a fibrous glass filler, lamellar glass filler and fibrous carbon filler.

The resin composition of the present invention contains the component B as an essential ingredient. The component B improves the fatigue characteristics of the aromatic polycarbonate resin composition containing the filler (component G). Meanwhile, the component B improves flame retardancy.

In general, the resin composition is based on balance among various properties, and it is difficult to change the components of the resin composition in most cases. For example, the fatigue characteristics of the resin composition can be improved by changing the type of a filler or increasing the amount of the filler. However, when the type of the filler is changed or the amount of the filler is increased, it exerts a bad influence upon other important properties such as appearance, impact strength, flame retardancy and cost in most cases. According to the present invention, this problem can be solved by the component B and inconvenience caused by the addition of other components is avoided.

The resin composition comprising the components A, B and G of the present invention is useful in various fields such as electronic and electric appliances, OA equipment, car parts, mechanical parts, agricultural materials, conveyance containers, play tools and miscellaneous goods.

(Fibrous Glass Filler)

Examples of the fibrous glass filler include glass fibers, metal coated glass fibers, metal oxide coated glass fibers and glass milled fibers.

The sectional form of each glass fiber which is the substrate of the fibrous glass filler is preferably spherical but may be elliptic, egg-like or three leaves-like, or a mixed shape thereof.

The average fiber diameter of the glass fibers is not particularly limited but preferably 1 to 25 μm, more preferably 3 to 17 μm. The number average fiber length of the glass fibers in the aromatic polycarbonate resin composition is preferably 60 to 500 μm, more preferably 100 to 400 μm, particularly preferably 120 to 350 μm. The number average fiber length is a value calculated by an image analyzing apparatus from an image of the residue of glass fibers sampled by a treatment such as the high-temperature ashing of a molded product, dissolution in a solvent or decomposition with a chemical observed through an optical microscope. The value is calculated by a method in which fibers having a fiber diameter smaller than a certain value are not counted. This method is also employed for the component G. The aspect ratio of the glass fibers is preferably 10 to 200, more preferably 15 to 100, much more preferably 20 to 50. The aspect ratio of the glass fibers is a value obtained by dividing the average fiber length by the average fiber diameter.

The glass milled fibers are manufactured by changing ordinary glass fibers to short fibers with a grinder such as a ball mill. The aspect ratio of the glass milled fibers which can vary according to the degree of grinding is preferably 2 to 10, more preferably 3 to 8. The number average fiber length of the glass milled fibers in the aromatic polycarbonate resin composition is preferably 5 to 150 μm, more preferably 9 to 80 μm. The average fiber diameter of the glass milled fibers is preferably 1 to 15 μm, more preferably 3 to 13 μm.

(Lamellar Glass Filler)

Examples of the lamellar glass filler include glass flakes, metal coated glass flakes and metal oxide coated glass flakes.

The average particle diameter of the glass flakes which are the substrate of the lamellar glass filler is preferably 10 to 1,000 μm, more preferably 20 to 500 μm, much more preferably 30 to 300 μm. Within the above range, the lamellar glass filler has excellent handling ease and moldability. In general, the glass flakes are cracked by melt kneading with a resin, whereby the average particle diameter of the glass flakes becomes small. The glass flakes in the resin composition have a particle diameter of preferably 10 to 200 μm, more preferably 15 to 100 μm, much more preferably 20 to 80 μm. The number average particle diameter of the glass flakes is the value of one side of a square obtained from the number average value of an area calculated by an image analyzing apparatus. The value is calculated by a method in which flakes having a thickness smaller than a certain value are not counted.

The thickness is preferably 0.5 to 10 μm, more preferably 1 to 8 μm, much more preferably 1.5 to 6 μm. Glass flakes having the above number average diameter and thickness are excellent in terms of moldability, the appearance of a molded product, strength and stiffness.

The glass compositions of the above fibrous glass fillers and lamellar glass fillers are typified by A glass, C glass and E glass and not particularly limited. The glass fillers may optionally contain $TiO_2$, $SO_3$ and $P_2O_5$. Out of these, E glass (non-alkali glass) is more preferred. Glass fillers whose surfaces are treated with a known surface treating agent such as silane coupling agent, titanate coupling agent or aluminate coupling agent are preferred from the viewpoint of improved mechanical strength. Glass fibers (including metal coated or metal oxide coated glass fibers) and glass flakes (including metal coated and metal oxide coated glass flakes) collected by a resin such as olefin-based resin, epoxy-based resin or urethane-based resin are preferably used. Glass fillers treated with an epoxy-based resin are particularly preferred in the present invention as they have excellent adhesion to the component A and excellent fatigue characteristics thereby.

As described above, the fibrous glass fillers and lamellar glass fillers include those coated with a different material. Preferred examples of the different material include metals and metal oxides. The metals include silver, copper, nickel and aluminum. The metal oxides include titanium oxide, cerium oxide, zirconium oxide, iron oxide, aluminum oxide and silicon oxide. The method of coating with the different material is not particularly limited and known plating techniques (such as electroplating, electroless plating and melt plating), vacuum deposition, ion plating, CVD (such as thermal CVD, MOCVD and plasma CVD), PVD and sputtering may be employed.

(Fibrous Carbon Filler)

Examples of the fibrous carbon filler include carbon fibers, metal coated carbon fibers, carbon milled fibers, vapor deposition carbon fibers and carbon nano-tubes. The carbon nano-tubes have a fiber diameter of 0.003 to 0.1 μm and may consist of a single layer, double layers or multiple layers, preferably multiple layers (so-called "MWCNT"). Out of these, carbon fibers and metal coated carbon fibers are preferred because they have excellent fatigue characteristics and can provide high conductivity. High conductivity is one of important features required for resin materials in recent digital precision instruments (typified by digital still cameras).

The average fiber diameter of the carbon fibers is not particularly limited but generally 3 to 15 μm, preferably 5 to 13 μm. The carbon fibers having the above average fiber diameter can exhibit excellent mechanical strength and fatigue characteristics without impairing the appearance of a molded product. As for the preferred fiber length of the carbon fibers, the number average fiber length in the aromatic polycarbonate resin composition is 60 to 500 μm, preferably 80 to 400 μm, particularly preferably 100 to 300 μm. The calculation of the above value is made by the method in which carbon fibers having a fiber length smaller than a certain value are not counted. The aspect ratio of the carbon fibers is preferably 10 to 200, more preferably 15 to 100, much more preferably 20 to 50. The aspect ratio of the fibrous carbon filler is a value obtained by dividing the average fiber length by the average fiber diameter.

Further, the surfaces of the carbon fibers are preferably oxidized to improve adhesion to a matrix resin and mechanical strength. The oxidation method is not particularly limited and a known method may be used.

The metal coated carbon fibers have a metal coating layer on the surfaces of carbon fibers. Examples of the metal include silver, copper, nickel and aluminum. Nickel is preferred from the viewpoint of the corrosion resistance of the metal layer. As the means of coating the metal, the above techniques for coating the surface of the glass filler with a different material may be employed. Out of these, plating is preferred. In the case of the metal coated carbon fibers, the above carbon fibers may be used as the basic carbon fibers. The thickness of the metal coating layer is preferably 0.1 to 1 μm, more preferably 0.15 to 0.5 μm, much more preferably 0.2 to 0.35 μm.

The carbon fibers and the metal coated carbon fibers are preferably collected with a resin such as an olefin-based resin, epoxy-based resin or urethane-based resin. Fibrous carbon fillers treated with an epoxy-based resin are preferred in the present invention because they are excellent in fatigue characteristics.

The amount of at least one filler (component G) selected from the group consisting of a fibrous glass filler, fibrous carbon filler and lamellar glass filler of the present invention is 1 to 200 parts by weight, preferably 2 to 60 parts by weight, more preferably 3 to 30 parts by weight based on 100 parts by weight of the component A. When the amount is smaller than 1 part by weight, the improvement of characteristic properties expected by adding the filler, such as stiffness, strength and fatigue characteristics may become unsatisfactory. When the amount is larger than 200 parts by weight, the toughness of the whole composition becomes unsatisfactory disadvantageously.

(Component H: Silicate Mineral)

The resin composition of the present invention may contain a silicate mineral (component H).

The resin composition of the present invention contains the component B as an essential ingredient. The component B improves the heat stability of an aromatic polycarbonate resin composition containing a silicate mineral, specifically at least one silicate mineral selected from the group consisting of mica, talc and wollastonite. Meanwhile, the addition of the component B improves flame retardancy. Therefore, there is provided a resin composition having excellent hue, flame retardancy, moist heat resistance and heat stability.

In general, the heat stability of the resin composition can be improved to a certain extent by a surface treatment or the addition of a heat stabilizer. However, the surface treatment or the addition of a heat stabilizer may exert a bad influence upon other important properties such as appearance, impact strength, flame retardancy and cost in most cases. According to the present invention, this problem can be solved by the component B, whereby inconvenience caused by the addition of other components is avoided.

Therefore, the resin composition comprising the components A, B and H of the present invention is useful in various fields such as electronic and electric appliances, OA equipment, car parts, mechanical parts, agricultural materials, conveyance containers, play tools and miscellaneous goods. It is particularly useful in the fields of the housings of OA equipment and the display fixed frames of flat panel displays (LCD, organic EL, electronic paper and plasma displays).

The component H is a silicate mineral comprising at least a metal oxide component and a $SiO_2$ component. The silicate mineral as the component H is preferably an orthosilicate, disilicate, cyclic silicate or chain silicate. The silicate mineral as the component H is crystalline and the crystal may be of any form that the silicate mineral can take. The shape of the crystal may be various types such as fibrous or lamellar.

The component H may be any compound such as a composite oxide, oxyacid salt (composed of an ion lattice) or solid solution. The composite oxide may be a combination of two or more oxides, or a combination of one oxide and one or more oxyacid salts. The solid solution may be a solid solution of two or more metal oxides, or a solid solution of two or more oxyacid salts.

The component H may be a hydrate, and an artificially synthesized product corresponding to a natural product may also be used. The silicate minerals which can be used as the component H of the present invention are described in detail in JP-A 2003-82218.

Out of the silicate minerals (component H), mica, talc and wollastonite are particularly preferred because they have a large effect of improving stiffness and low warpage and can be easily acquired.

(Talc)

Talc in the present invention is chemically hydrous magnesium silicate which is generally represented by a chemical formula $4SiO_2 \cdot 3MgO \cdot 2H_2O$ and flaky particles having a lamellar structure. It comprises 56 to 65 wt % of $SiO_2$, 28 to 35 wt % of $MgO$ and about 5 wt % of $H_2O$. As other trace components, it contains 0.03 to 1.2 wt % of $Fe_2O_3$, 0.05 to 1.5 wt % of $Al_2O_3$, 0.05 to 1.2 wt % of $CaO$, 0.2 wt % or less of $K_2O$ and 0.2 wt % or less of $Na_2O$. Preferably, talc comprises 62 to 63.5 wt % of $SiO_2$, 31 to 32.5 wt % of $MgO$, 0.03 to 0.15 wt % of $Fe_2O_3$, 0.05 to 0.25 wt % of $Al_2O_3$ and 0.05 to 0.25 wt % of $CaO$. The weight loss on heating of talc is preferably 2 to 5.5 wt %.

The average particle diameter measured by a precipitation method of talc is preferably 0.1 to 50 μm (more preferably 0.1 to 10 μm, much more preferably 0.2 to 5 μm, particularly preferably 0.2 to 3.5 μm). Further, talc having a bulk density of 0.5 g/cm$^3$ or more is particularly preferably used as a raw material. The average particle diameter of talc is called D50 (median diameter of a particle size distribution) measured by an X-ray transmission method which is one of liquid-phase precipitation methods. An example of the instrument for measuring the average particle diameter is the Sedigraph5100 of Micromeritics Co., Ltd.

The method of manufacturing talc from an ore by grinding is not particularly limited and known methods such as a jet mill method may be employed. Talc which is uniform in particle diameter and obtained by grinding and classifying the ground product with a classifier is preferred. The classifier is not particularly limited, and an impact type inertia force classifier, Coanda effect-use inertia force classifier and centrifugal classifier may be employed.

Further, talc in an agglomerated state is preferred from the viewpoint of handling ease. To manufacture this talc in an agglomerated state, a method in which deaeration compression is used and a method in which a greige agent is used for compression are employed. The method making use of deaeration compression is particularly preferred because it is simple and the unrequired greige agent resin component is not mixed into the resin composition of the present invention.

(Mica)

Mica having an average particle diameter of 5 to 250 μm may be used. Mica having an average particle diameter (D50 (median diameter of a particle size distribution)) measured by a laser diffraction/scattering method of 5 to 50 μm is preferred. When the average particle diameter of mica is smaller than 5 μm, the effect of improving stiffness is hardly obtained. A resin composition containing mica having an average particle diameter of more than 250 μm deteriorates in appearance and flame retardancy while its mechanical properties tend to become saturated. The average particle diameter of mica is measured by a laser diffraction/scattering method or a vibration screening method. The laser diffraction/scattering method is preferred for mica having a 325-mesh pass measured by a vibration screening method of 95 wt % or more. The vibration screening method is generally used for mica having a larger particle diameter. In the vibration screening method of the present invention, 100 g of mica powders are put through JIS standard sieves which are placed one upon another in the order of the size of opening for 10 minutes and the weight of powders remaining on the sieves is measured to obtain a particle size distribution.

Mica having a thickness measured by observing through an electron microscope of 0.01 to 1 μm may be used. The thickness is preferably 0.03 to 0.3 μm. The aspect ratio of mica is 5 to 200, preferably 10 to 100. Mica to be used is preferably Muscovite mica having a Mohs hardness of about 3. Muscovite mica can achieve higher stiffness and higher strength than other mica such as phlogopite, and the object of the present invention is attained at a high level. Mica may be manufactured by a dry grinding method or a wet grinding method. Although the dry grinding method is commonly used due to low costs, the wet grinding method is effective in grinding mica thinner more finely (the effect of improving the stiffness of the resin composition becomes greater). In the present invention, mica manufactured by the wet grinding method is preferred.

(Wollastonite)

The fiber diameter of wollastonite is preferably 0.1 to 10 μm, more preferably 0.1 to 5 μm, much more preferably 0.1 to 3 μm. The aspect ratio (average fiber length/average fiber diameter) of wollastonite is preferably 3 or more. The upper limit of the aspect ratio is 30. As for the fiber diameter, a reinforced filler is observed through an electron microscope to obtain the fiber diameter of each fiber so as to calculate the number average fiber diameter from the measurement values. The reason for the use of the electron microscope is that it is difficult to measure the size of wollastonite accurately with an optical microscope. As for the fiber diameter, fillers to be measured are chosen at random from an image obtained by observing through the electron microscope and their fiber diameters are measured at positions close to the center portions of the fibers to calculate the number average fiber diameter from the obtained measurement values. The magnification of the microscope is about 1,000×, and the number of fibers to be measured is 500 or more (600 or less is preferred for work efficiency). As for the measurement of the average fiber length, the fillers are observed through an optical microscope to obtain the length of each fiber so as to calculate the number average fiber length from the measurement values. For observation through the optical microscope, a sample in which fillers are dispersed well and are not overlapped with one another is first prepared. Observation is carried out with a 20-power objective lens and this observed image is picked up as image data by a CCD camera having about 250,000 pixels. The fiber length is calculated from this obtained image data by using an image analyzing apparatus and a program for obtaining the maximum distance between two points of the image data. Under the conditions, the size of each pixel is equivalent to a length of 1.25 μm, and the number of the measured fibers is 500 or more (600 or less is preferred for work efficiency).

It is preferred that iron contained in a raw material ore and iron contained by the abrasion of equipment when the raw material ore is ground be removed as much as possible by a magnetic separator in order to fully reflect the whiteness of wollastonite of the present invention upon the resin composition. The iron content of wollastonite reduced by the separator is preferably 0.5 wt % or less in terms of $Fe_2O_3$.

Although it is preferred that the silicate mineral (more preferably mica, talc or wollastonite) in the present invention should not be surface treated, it may be surface treated with a surface treating agent such as a silane coupling agent (including alkylalkoxysilanes and polyorganohydrogensiloxanes), fatty acid ester, acid compound (for example, phosphorous acid, phosphoric acid, carboxylic acid or carboxylic anhydride) or wax. Further, it may be granulated with a greige agent such as a resin, fatty acid ester or wax. The silicate mineral in the present invention is particularly preferably talc. Although talc is excellent in terms of stiffness and impact resistance like wollastonite, when it is added to an aromatic polycarbonate resin directly, the deterioration of hue and appearance (for example, the generation of a silver streak) is marked. The resin composition of the present invention comprising talc as the silicate mineral is most markedly improved in hue, whereby a resin composition comprising talc can be used in a wide variety of technical fields. For this reason, talc is particularly preferred as the silicate mineral.

The amount of the component H in the present invention is 1 to 100 parts by weight, preferably 5 to 30 parts by weight, more preferably 8 to 25 parts by weight based on 100 parts by weight of the aromatic polycarbonate resin as the component A. When the amount of the component H is smaller than 1 part by weight based on 100 parts by weight of the component A, the effect of improving stiffness becomes unsatisfactory and when the amount is larger than 100 parts by weight, high heat stability is hardly retained. When the amount of the component H is within the preferred range, excellent stiffness and heat stability can be obtained at the same time.

(Component I: Titanium Dioxide Pigment)

The resin composition of the present invention may contain a titanium dioxide pigment (component I). Since the resin composition of the present invention is used as a highly light reflective material, a resin composition comprising the component I in a high concentration has the following features as compared with the addition of this pigment as a colorant. That is, when the resin composition of the present invention comprises the components B and I, flame retardancy is improved and reductions in heat stability and light reflection characteristics and variations in light reflection characteristics caused by the component B are suppressed.

Therefore, the highly light reflective resin composition of the present invention comprising the components A, B and I is advantageously used in light reflective materials in various industrial fields such as OA equipment and electric and electronic appliances. More specifically, the light reflective materials include lamp reflectors such as reflectors for floodlight such as fluorescent lamps, backlight reflectors for displays such as liquid crystal displays, reflectors for switches, reflectors for LED arrays and reflectors having a combined function thereof.

As the titanium dioxide pigment (component I) may be used what is used for a coloring purpose and widely known per se. A titanium dioxide pigment consisting of 100 wt % of $TiO_2$ based on 100 wt % of a metal oxide component is existent (in the present invention, the titanium dioxide component of the titanium dioxide pigment is expressed as "$TiO_2$" and a pigment containing a surface treating agent is generally expressed as "titanium dioxide pigment"). However, a surface treatment with a metal oxide such as aluminum, silicon, zirconium or zinc is generally carried out to improve weatherability and hue. A titanium dioxide pigment comprising 89 to 97 wt % of $TiO_2$ based on 100 wt % of the titanium dioxide pigment and surface treated with a metal oxide typified above is preferred. More preferred is the above titanium dioxide pigment surface treated with at least $Al_2O_3$ and comprising preferably 0.5 to 4 wt %, more preferably 0.5 to 3 wt %, much more preferably 0.5 to 2.5 wt % of $Al_2O_3$ based on 100 wt % of the titanium dioxide pigment.

The preferred titanium dioxide pigment comprises preferably 91 to 97 wt %, more preferably 91 to 95 wt % of $TiO_2$ based on 100 wt % of the titanium dioxide pigment.

The above preferred titanium dioxide pigment is surface treated with preferably $SiO_2$ and/or $ZrO_2$, particularly preferably $SiO_2$, in addition to $Al_2O_3$. Therefore, the more preferred titanium dioxide pigment of the present invention is the above preferred titanium dioxide pigment surface treated with preferably 0.5 to 5 wt %, more preferably 1 to 3 wt %, much more preferably 1 to 2.5 wt % of $SiO_2$ based on 100 wt % of the titanium dioxide pigment.

The metal oxide component for the above surface treatment does not need to be existent only on the surface of $TiO_2$ but may be partially existent in the insides of $TiO_2$ particles.

The crystal form of $TiO_2$ may be either anatase type or rutile type, and these types of crystals may be used in combination. Rutile type $TiO_2$ is preferred from the viewpoints of initial mechanical properties and long-term weatherability. Anatase type crystals may be contained in rutile type crystals. Further, the method of manufacturing $TiO_2$ may be a sulfuric acid method, chlorine method or other method. The chlorine method is preferred. The titanium dioxide pigment of the present invention is not limited to a particular shape but preferably particulate. The average particle diameter of the titanium dioxide pigment is preferably 0.01 to 0.4 μm, more preferably 0.1 to 0.3 μm, much more preferably 0.15 to 0.25 μm. The average particle diameter is calculated by observing through an electron microscope to measure the particle diameter of each particle and calculating the number average value from the measurement values.

The surface treatment with a metal oxide may be either a high-density treatment or a low-density (porous) treatment.

The titanium dioxide pigment as the component I is preferably surface treated with an organic compound. As the surface treating agent may be used known treating agents such as polyol-based, amine-based and silicone-based treating agents. The preferred surface treating agent is, for example, a silicone-based surface treating agent such as an alkylchlorosilane (such as trimethylchlorosilane), alkylalkoxysilane (such as methyltrimethoxysilane) or alkyl hydrogen polysiloxane (such as methyl hydrogen polysiloxane) A suitable surface treatment with the above organic compound is preferred because it improves dispersibility and further enhances heat stability. The amount of the organic compound used for the above surface treatment is preferably 0.05 to 5 wt %, more preferably 0.5 to 3 wt %, much more preferably 0.5 to 2.5 wt % based on 100 wt % of the titanium dioxide pigment.

When the resin composition of the present invention is used as a highly light reflective material, the amount of the component I is 3 to 35 parts by weight, preferably 5 to 30 parts by weight, more preferably 8 to 28 parts by weight based on 100 parts by weight of the aromatic polycarbonate resin as the component A. When the amount of the component I is smaller than 3 parts by weight, light reflection may become unsatisfactory and when the amount is larger than 35 parts by weight, heat stability may become unsatisfactory.

(Radical Generator)

The flame retardancy of the resin composition of the present invention can be further improved by a radical generator such as 2,3-dimethyl-2,3-diphenylbutane(dicumyl).

(Phosphorus-Based Stabilizer)

The resin composition of the present invention preferably further contains a phosphorus-based stabilizer. The phosphorus-based stabilizer improves heat stability at the time of manufacture or molding and also improves mechanical properties, hue and molding stability. Examples of the phosphorus-based stabilizer include phosphorous acid, phosphoric acid, phosphonous acid, phosphonic acid and esters thereof, and tertiary phosphines.

The phosphite compounds include trialkyl phosphites such as tridecyl phosphite, dialkylmonoaryl phosphites such as didecylmonophenyl phosphite, monoalkyldiaryl phosphites such as monobutyldiphenyl phosphite, triaryl phosphites such as triphenyl phosphite and tris(2,4-di-tert-butylphenyl) phosphite, pentaerythritol phosphites such as distearyl pentaerythritol diphosphite, bis(2,4-di-tert-butylphenyl)pentaerythritol diphosphite, bis(2,4-dicumylphenyl)pentaerythritol diphosphite and bis(2,6-di-tert-butyl-4-methylphenyl)pentaerythritol diphosphite, and cyclic phosphites such as 2,2-methylenebis(4,6-di-tert-butylphenyl)octyl phosphite and 2,2'-methylenebis(4,6-di-tert-butylphenyl)(2,4-di-tert-butylphenyl)phosphite.

The phosphate compounds include tributyl phosphate, trimethyl phosphate, tricresyl phosphate, triphenyl phosphate, triethyl phosphate, diphenylcresil phosphate, diphenyl monoorthoxenyl phosphate, tributoxyethyl phosphate and diisopropyl phosphate. Out of these, triphenyl phosphate and trimethyl phosphate are preferred.

The preferred phosphonite compounds are tetrakis(di-tert-butylphenyl)-biphenylene diphosphonite and bis(di-tert-butylphenyl)-phenyl-phenyl phosphonite, out of which tetrakis(2,4-di-tert-butylphenyl)-biphenylene diphosphonite and bis(2,4-di-tert-butylphenyl)-phenyl-phenyl phosphonite are more preferred. The above phosphonite compounds can be used in combination with a phosphite compound having an aryl group substituting two or more of the above alkyl groups, which is preferred.

The phosphonate compounds include dimethyl benzenephosphonate, diethyl benzenephosphonate and dipropyl benzenephosphonate. The tertiary phosphines include triphenyl phosphine.

(Hindered Phenol-Based Stabilizer)

The resin composition of the present invention may further contain a hindered phenol-based stabilizer to prevent its deterioration by dry heat. Known hindered phenol-based stabilizers may be used, as exemplified by octadecyl-3-(3,5-di-tert-butyl-4-hydroxyphenyl) propionate, 2-tert-butyl-6-(3'-tert-butyl-5'-methyl-2'-hydroxybenzyl)-4-methylphenyl acrylate, 4,4'-butylidenebis(3-methyl-6-tert-butylphenol), triethylene glycol-N-bis-3-(3-tert-butyl-4-hydroxy-5-methylphenyl)propionate, 3,9-bis{2-[3-(3-tert-butyl-4-hydroxy-5-methylphenyl) propionyloxy]-1,1,-dimethylethyl}-2,4,8,10-tetraoxaspiro[5,5]undecane, N,N'-hexamethylenebis-(3,5-di-tert-butyl-4-hydroxyhydrocinnamide), 1,3,5-trimethyl-2,4,6-tris(3,5-di-tert-butyl-4-hydroxybenzyl)benzene and tetrakis[methylene-3-(3,5-di-tert-butyl-4-hydroxyphenyl) propionate]methane. All of them can be easily acquired. Out of these, octadecyl-3-(3,5-di-tert-butyl-4-hydroxyphenyl) propionate is preferred. The above hindered phenol-based stabilizers may be used alone or in combination of two or more.

At least one stabilizer selected from a phosphorus-based stabilizer and a hindered phenol-based stabilizer is added in an amount of 0.0001 to 1 part by weight, preferably 0.001 to 0.1 part by weight, more preferably 0.005 to 0.1 part by weight based on 100 parts by weight of the aromatic polycarbonate resin (component A). When the amount of the stabilizer is too smaller than the above range, a good stabilizing effect is hardly obtained and when the amount is too larger than the above range, the physical properties of the composition may deteriorate.

(Other Resin and Elastomer)

The resin composition of the present invention may contain small amounts of other resin and an elastomer as far as the object of the present invention is not adversely affected.

Examples of the other resin include polyester resins such as polyethylene terephthalate and polybutylene terephthalate, polyamide resins, polyimide resins, polyether-imide resins, polyurethane resins, silicone resins, polyphenylene ether resins, polyphenylene sulfide resins, polysulfone resins, polyolefin resins such as polyethylene and polypropylene, polystyrene resins, acrylonitrile/styrene copolymer (AS resin), acrylonitrile/butadiene/styrene copolymer (ABS resin), polymethacrylate resins, phenol resins and epoxy resins.

Examples of the elastomer include isobutylene/isoprene rubber, styrene/butadiene rubber, ethylene/propylene rubber, acrylic elastomers, polyester-based elastomers, polyamide-based elastomers, MBS (methyl methacrylate/styrene/butadiene) rubber which is a core-shell type elastomer and MAS (methyl methacrylate/acrylonitrile/styrene) rubber.

The aromatic polycarbonate resin composition of the present invention may contain known additives in small amounts to provide various functions to molded products and improve characteristic properties. These additives are used in usual amounts as far as the object of the present invention is not adversely affected.

The additives include a lubricant (such as PTFE particles), colorant (pigment and dye other than titanium oxide), light diffuser (such as acrylic crosslinked particles, silicone crosslinked particles and calcium carbonate particles), fluorescent whitener, fluorescent dye, inorganic phosphor (phosphor comprising an aluminate as mother crystal), antistatic agent, fluidity modifier, crystal nucleating agent, inorganic or organic anti-fungus agent, optical catalyst-based stain-proofing agent (excluding titanium oxide, for example, zinc oxide fine particles), impact modifier typified by graft rubber, infrared light absorber (heat ray absorber), and photochromic agent.

(Haze Value)

The resin composition of the present invention is preferably the above resin composition and a smooth flat plate having an arithmetic average roughness (Ra) of 0.03 μm and a thickness of 2 mm molded out of the resin composition has a haze value measured in accordance with JIS K7105 of preferably 0.3 to 20%, more preferably 0.3 to 5%, much more preferably 0.3 to 3%. The haze value is measured with a haze meter. The smooth flat plate is obtained by drying a pellet and injection molding it in a cavity formed by the surface of a metal mold having an arithmetic average roughness (Ra) of 0.03 μm. The arithmetic average roughness (Ra) of the surface of the metal mold can be measured with a surface roughness meter.

(Preferred Resin Compositions)

In the present invention, the following resin compositions are preferred.

(1) A resin composition comprising 100 parts by weight of the component A, 0.005 to 0.6 part by weight of the component B and 0.01 to 5 parts by weight of the component C. This composition has excellent flame retardancy due to the multiplication effect of the components B and C. Since the addition of a small amount of the component B can provide flame retardancy, the resin composition has excellent transparency. The component C is preferably a phosphate compound (component C-1), silicone compound (component C-2) or brominated polycarbonate (component C-3), particular preferably a silicone compound.

(2) A resin composition comprising 100 parts by weight of the component A, 0.005 to 0.6 part by weight of the component B, 0.01 to 5 parts by weight of the component C and 0.005 to 2 parts by weight of the component D. The component D (fatty acid ester) improves the releasability of the resin composition. On the other hand, the fatty acid ester has a defect that it is combustible. However, this resin composition has excellent flame retardancy due to the multiplication effect of the components B and C and excellent releasability. Since the addition of small amounts of the components B and C can provide flame retardancy, the resin composition has excellent transparency.

(3) A resin composition comprising 100 parts by weight of the component A, 0.005 to 0.6 part by weight of the component B, 0.01 to 5 parts by weight of the component C, 0.005 to 2 parts by weight of the component D and 0.01 to 7 parts by weight of the component E. This resin composition has good balance among releasability, flame retardancy, weatherability and transparency.

(4) A resin composition comprising 100 parts by weight of the component A, 0.005 to 0.6 part by weight of the component B, 0.005 to 2 parts by weight of the component D and 0.01 to 7 parts by weight of the component E. This resin composition has good balance among releasability, flame retardancy, weatherability and transparency.

(5) A resin composition comprising 100 parts by weight of the component A, 0.005 to 0.6 part by weight of the component B and 0.001 to 1 part by weight of the component F. This resin composition suppresses the cohesion of the component F by a combination of the components B and F and has excellent flame retardancy.

(6) A resin composition comprising 100 parts by weight of the component A, 0.005 to 0.6 part by weight of the component B, 0.01 to 5 parts by weight of the component C, 0.005 to 2 parts by weight of the component D and 0.001 to 1 part by weight of the component F. This resin composition suppresses the cohesion of the component F by a combination of the components B and F and has excellent flame retardancy.

(7) A resin composition comprising 100 parts by weight of the component A, 0.005 to 0.6 part by weight of the component B, 0.01 to 5 parts by weight of the component C, 0.005 to 2 parts by weight of the component D, 0.01 to 7 parts by weight of the component E and 0.001 to 1 part by weight of the component F. This resin composition suppresses the cohesion of the component F by a combination of the components B and F and has excellent flame retardancy and weatherability.

(8) A resin composition comprising 100 parts by weight of the component A, 0.005 to 0.6 part by weight of the component B, 0.01 to 5 parts by weight of the component C and 0.001 to 1 part by weight of the component F. This resin composition suppresses the cohesion of the component F by a combination of the components B and F and has excellent flame retardancy.

(9) A resin composition comprising 100 parts by weight of the component A, 0.005 to 0.6 part by weight of the component B and 1 to 200 parts by weight of the component G. This resin composition has excellent flame retardancy and fatigue resistance.

(10) A resin composition comprising 100 parts by weight of the component A, 0.005 to 0.6 part by weight of the component B, 0.005 to 2 parts by weight of the component D and 1 to 200 parts by weight of the component G. This resin composition has excellent flame retardancy, fatigue resistance and releasability.

(11) A resin composition comprising 100 parts by weight of the component A, 0.005 to 0.6 part by weight of the component B, 0.01 to 7 parts by weight of the component E, 0.001 to 1 part by weight of the component F and 1 to 100 parts by weight of the component H. This resin composition is excellent in terms of hue, flame retardancy, moist heat resistance and heat stability.

(12) A resin composition comprising 100 parts by weight of the component A, 0.005 to 0.6 part by weight of the component B, 0.005 to 2 parts by weight of the component D, 0.001 to 1 part by weight of the component F and 3 to 35 parts by weight of the component I. This resin composition is excellent in terms of flame retardancy, heat stability and light reflection.

(13) A resin composition comprising 100 parts by weight of the component A, 0.005 to 0.6 part by weight of the component B, 0.005 to 2 parts by weight of the component D and 3 to 35 parts by weight of the component I. This resin composition is excellent in terms of flame retardancy, heat stability and light reflection.

(Manufacture of Resin Composition)

The resin composition of the present invention can be manufactured by mixing together (1) 100 parts by weight of an aromatic polycarbonate resin (component A), (2) 0.005 to 0.6 part by weight of a fluorine-containing organic metal salt having a fluoride ion content measured by ion chromatography of 0.2 to 20 ppm in terms of weight (component B) and (3) at least one selected from the group consisting of a flame retardant other than the fluorine-containing organic metal salt (component C), a fatty acid ester (component D), an ultraviolet light absorber (component E), polytetrafluoroethylene having fibril formability (component F), a filler (component G), a silicate mineral (component H) and a titanium dioxide pigment (component I).

The component B is manufactured through (i) the step of obtaining a solution containing an alkali metal salt of a perfluoroalkylsulfonic acid by neutralizing a perfluoroalkylsulfonic acid or perfluoroalkylsulfonyl fluoride with a carbonate or hydroxide of an alkali metal and ion exchange water, (ii) the step of obtaining a precipitate by cooling the solution, (iii) the step of separating the precipitate, (iv) the step of washing the separated precipitate with ion exchange water, and (v) the step of drying the washed product. Then, the component B can be mixed with the component A.

For example, the component A, the component B, the components C to I and optional components are supplied into a melt kneader typified by a vented double-screw extruder to be melt kneaded together. In general, a strand extruded from the dice of the extruder is let pass through a water tank to be cooled, and the cooled strand is cut with a pelletizer to obtain a pellet of the resin composition. Before these components are supplied into the extruder, the raw materials can be pre-mixed together. The pre-mixing means is a twin-cylinder blender, Henschel mixer, mechanochemical apparatus or extrusion mixer. The raw materials and the pre-mixture may be optionally granulated with an extrusion granulator or briquetting machine.

To supply the components into the melt kneader, (i) the components A, B, C to I and others are supplied into the melt kneader independently, (ii) the components A, B, C to I and some of the other components are pre-mixed together, and the resulting pre-mixture is supplied into the melt kneader together with the rest, (iii) the component B is diluted and mixed with water or an organic solvent and supplied into the melt kneader, or (iv) the diluted mixture is pre-mixed with other components and then supplied into the melt kneader. When there is a liquid component (in the above methods (iii) and (iv), for example), a liquid injector or liquid adder may be used to supply it into the melt kneader.

The preferred extruder has a vent from which water contained in the raw materials and a volatile gas generated from the molten kneaded resin can be removed. A pressure reducing pump such as a vacuum pump is preferably installed in the vent to discharge the generated water or volatile gas to the outside of the extruder efficiently. A screen for removing foreign matter contained in the extruded raw materials may be installed in a zone before the dice of the extruder to remove the foreign matter from the resin composition. Examples of the screen include a metal net, screen changer and sintered metal plate (such as a disk filter). Examples of the melt kneader include a Banbury mixer, kneading roll, single-screw extruder and multi-screw extruder having 3 or more screws besides the double-screw extruder.

The resin extruded as described above may be cut into a pellet directly. When it is necessary to reduce the influence of external dust at the time of pelletization, the atmosphere surrounding the extruder is preferably cleaned. The shape of the obtained pellet may be a general shape such as columnar, square pillar-like or spherical shape but preferably a columnar shape. The diameter of the columnar pellet is preferably 1 to 5 mm, more preferably 2 to 3.3 mm. The length of the columnar pellet is preferably 1 to 30 mm, more preferably 2.5 to 3.5 mm.

(Molded Product)

A molded product of the resin composition of the present invention can be generally obtained by injection molding the above pellet. The injection molding may be not only ordinary molding but also injection compression molding, injection press molding, gas assist injection molding, foam molding (including a method for injecting a supercritical fluid), insert molding, in-mold coating molding, insulated runner molding, quick heating and cooling molding, double-color molding, sandwich molding or super high-speed injection molding. Molding may be of cold runner or hot runner system.

Special form extrusion molded products, sheets and films can be manufactured from the resin composition of the present invention by extrusion molding. A molded product of the resin composition of the present invention may be manufactured by employing inflation, calendaring, casting, rotational molding or blow molding. A thermally shrunk material may be molded by further carrying out a specific stretching operation.

The molded product of the present invention can be subjected to various surface treatments. The surface treatments include hard coating, water-repellent and oil-repellent coating, hydrophilic coating, antistatic coating, ultraviolet light absorption coating, infrared light absorption coating and metallizing (deposition). Examples of the surface treating method include the coating of a solvent, deposition, flame spray coating and plating. Examples of physical vapor deposition include vacuum deposition, sputtering and ion plating, and examples of chemical vapor deposition (CVD) include thermal CVD, plasma CVD and optical CVD.

(Method of Preventing Dripping)

The present invention provides a method of preventing the dripping at the time of combustion of a resin composition comprising (1) an aromatic polycarbonate resin (component A), (2) a fluorine-containing organic metal salt and (3) at least one component selected from the group consisting of the components C, D, E, F, G, H and I. A fluorine-containing organic metal salt (component B) having a fluoride ion content measured by ion chromatography of 0.2 to 20 ppm in terms of weight is used in an amount of 0.005 to 0.6 part by weight based on 100 parts by weight of the component A as the fluorine-containing organic metal salt (2). By using a predetermined amount of the component B, the dripping at the time of combustion of the resin composition can be prevented effectively.

(Flame Retardant)

The present invention includes a flame retardant for aromatic polycarbonate resins, which is composed of a fluorine-containing organic metal salt having a fluoride ion content measured by ion chromatography of 0.2 to 20 ppm in terms of weight.

The flame retardant is effectively used in a resin composition comprising (1) component A and (3) at least one component selected from the group consisting of components C, D, E, F, G, H and I.

(Master Batch)

The present invention includes a master batch comprising the above flame retardant and an aromatic polycarbonate resin.

EXAMPLES

The following examples are provided for the purpose of further illustrating the present invention but are in no way to be taken as limiting. In the following examples, the raw materials shown in Tables 1 to 13 are given below.

(Component A)

PC-1: linear aromatic polycarbonate resin powder having a viscosity average molecular weight of 22,500 (Panlite L-1225WP of Teijin Chemicals Ltd.)

PC-2: linear aromatic polycarbonate resin powder having a viscosity average molecular weight of 16,000 (CM-1000 of Teijin Chemicals Ltd.)

PC-3: branched aromatic polycarbonate resin (Taflon IB2500 of Idemitsu Petrochemical Co., Ltd.)

PC-4: linear aromatic polycarbonate resin having a viscosity average molecular weight of 121,500 manufactured from bisphenol A, p-tert-butylphenol as a terminal capping agent and phosgene in the presence of an amine-based catalyst PC-5: linear aromatic polycarbonate resin powder having a viscosity average molecular weight of 30,000 (Panlite K-1300WP of Teijin Chemicals Ltd.)

PC-6: linear aromatic polycarbonate resin powder having a viscosity average molecular weight of 19,700 (Panlite L-1225WX of Teijin Chemicals Ltd.)

PC-7: linear aromatic polycarbonate resin powder having a viscosity average molecular weight of 20,700 (Panlite L-1225WS of Teijin Chemicals Ltd.)

(Component A-Containing Component)

CBM: carbon black master pellet manufactured by melt mixing together 30 parts by weight of carbon black (Carbon Black MA-100 of Mitsubishi Chemical Co., Ltd.), 3 parts by weight of white mineral oil (Crystol N352 of Exxon Mobile Corporation), 0.2 part by weight of montanic ester wax (Ricolv WE-1 Powder of Clariant Japan Co., Ltd.) and 66.8 parts by weight of the above PC-2 with a double-screw extruder (Component B)

B-1: potassium perfluorobutanesulfonate having a fluoride ion content of 1 ppm (Manufacture of B-1)

100 parts by weight of the Megafac F-114P of Dainippon Ink and Chemicals, Inc. and 400 parts by weight of ion exchange water were fed to a glass flask equipped with a thermometer and stirrer, heated at 80° C., stirred in a nitrogen stream for 0.5 hour and cooled to room temperature (23° C.) to precipitate a crystal which was then collected by filtration. The crystal was washed with 700 parts by weight of ion exchange water and further with 600 parts by weight of methanol. After washing with 600 parts by weight of ion exchange water, the wet powder was dried with hot air at 80° C. in a nitrogen atmosphere for 20 hours, the obtained powder was ground with a mill and put through standard sieves No. 400 to obtain a product of interest. The ion exchange water was ion exchange water having an electric resistance of 18 MΩ·cm or more (that is, electric conductivity of about 0.55 μS/cm or less) which was obtained by passing through the Autopure WQ500 of Yamato Kagaku Co., Ltd. and will be simply referred to as "ion exchange water" hereinafter.

B-2: potassium perfluorobutanesulfonate having a fluoride ion content of 8 ppm (Manufacture of B-2)

100 parts by weight of the Megafac F-114P of Dainippon Ink and Chemicals, Inc. and 400 parts by weight of ion exchange water were fed to a glass flask equipped with a thermometer and stirrer, heated at 80° C., stirred for 0.5 hour and cooled to room temperature to precipitate a crystal which was then collected by filtration. After the crystal was washed with 700 parts by weight of ion exchange water, the wet powder was dried with hot air at 80° C. for 20 hours. The dried product was further washed with ion exchange water, the wet powder was dried with hot air at 80° C. for 20 hours, and the obtained powder was ground with a mill and put through standard sieves No. 400 to obtain a product of interest.

B-5: potassium perfluorobutanesulfonate having a fluoride ion content of 1 ppm (Manufacture of B-5)

250 parts by weight of ion exchange water and 46 parts by weight of potassium hydroxide (of Wako Pure Chemical Industries, Ltd.) were fed to a glass flask equipped with a thermometer, condenser and stirrer, and 100 parts by weight of perfluorobutanesulfonyl fluoride (of Wako Pure Chemical Industries, Ltd.) was added over about 1 hour under agitation at 60 rpm. The resulting solution was heated at 80° C., stirred for 7 hours, cooled to room temperature and further cooled with ice to precipitate a crystal which was then collected by filtration. The crystal was washed with 700 parts by weight of ion exchange water and further with 600 parts by weight of methanol. After washing with 600 parts by weight of ion exchange water, the wet powder was dried with hot air at 80° C. in a nitrogen atmosphere for 20 hours, and the obtained powder was ground with a mill and put through standard sieves No. 400 to obtain a product of interest.

B-6: potassium perfluorobutanesulfonate treated almost in the same manner as the above B-2 and having a fluoride ion content of 9 ppm (Other Than Component B)

B-3 (for comparison) potassium perfluorobutanesulfonate having a fluoride ion content of 40 ppm (BayowetC4 of Bayer AG)

B-4 (for comparison): potassium perfluorobutanesulfonate having a fluoride ion content of 126 ppm (Megafac F-114P of Dainippon Ink and Chemicals, Inc.)

(Component C)

SiH: silicone having a Si—H group and a phenyl group (Manufacture of SiH)

301.9 g of water and 150 g of toluene were fed to a 1-liter flask equipped with a stirrer, cooling device and thermometer, and the inside temperature of the flask was reduced to 5° C. A mixture of 21.7 g of trimethylchlorosilane, 23.0 g of methyldichlorosilane, 12.9 g of dimethyldichlorosilane and 76.0 g of diphenyldichlorosilane was fed to a dropping funnel and added dropwise to the inside of the flask under agitation over 2 hours. During this, cooling was continued to maintain the inside temperature of the flask at 20° C. or lower. After the end of addition, aging was carried out by keeping on agitation for 4 hours at an inside temperature of 20° C., a hydrochloric acid water layer separated by standing was removed, a 10% aqueous solution of sodium carbonate was added and stirred for 5 minutes, and a water layer separated by standing was removed. Thereafter, washing with ion exchange water was further carried out 3 times to confirm that a toluene layer became neutral. This toluene solution was heated at an inside temperature of 120° C. under reduced pressure to remove toluene and a low-boiling product, and an insoluble product was removed by filtration to obtain a silicone compound SiH. This silicon compound SiH had an Si—H content of 0.21 mol/100 g, an aromatic group content of 49 wt % and an average polymerization degree of 8.0.

X-40: organic siloxane compound (X-40-9243 of Shin-Etsu Chemical Co., Ltd., the contents of the compound are disclosed by JP-A 2003-082218, for example)

FG15: tris(2,4,6-tribromophenyl)phosphate (Fire Guard FG-1500 of Teijin Chemicals Ltd.)

KSS: organic sulfonic acid alkali metal salt comprising potassium diphenylsulfonesulfonate as the main ingredient (KSS of UCB Japan, Co., Ltd.)

FG70: brominated polycarbonate oligomer (Fire Guard FG-7000 of Teijin Chemicals Ltd.)

(Component D)

VPG: fatty acid ester comprising pentaerythritol tetrastearate as the main ingredient (Loxiol VPG861 of Cognis Japan Co. Ltd.)

EW: fatty acid ester comprising pentaerythritol tetrastearate as the main ingredient (Rikester EW-400 of Riken Vitamin Co., Ltd.)

SL: fatty acid ester comprising stearyl stearate and glycerin tristearate as main ingredients (Rikemal SL900 of Riken Vitamin Co., Ltd.)

(Component E)

UV79: benzotriazole-based ultraviolet light absorber (Chemisorb 79 of Chemipro Kasei Co., Ltd.)

CEIP: cyclic iminoester-based ultraviolet light absorber (2,2'-p-phenylenebis(3,1-benzooxazin-4-one), CEi-P of Takemoto Yushi Co., Ltd.)

LA31:

2,2'-methylenebis[6-(2H-benzotriazol-2-yl)-4-(1,1,3,3-tetramethylbutyl)phenol] (Adecastab LA-31 of Asahi Denka Kogyo K. K.)

(Component F)

PTFE: polytetrafluoroethylene having fibril formability (Polyflon MPA FA500 of Daikin Industries, Ltd.)

B449: a mixture of polytetrafluoroethylene particles having fibril formability and styrene-acrylonitrile copolymer particles (polytetrafluoroethylene content: 50 wt %) (BLENDEX B449 of GE Specialty Chemicals Co., Ltd.)

(Component G)

GF-1: glass fiber (ECS-03T-511 of Nippon Electric Glass Co., Ltd., diameter of 13 μm, cut length of 3 mm, aminosilane treated, urethane-based greige agent)

GF-2: glass fiber (3PE937 of Nitto Boseki Co., Ltd., fiber diameter: 13 μm, cut length: 3 mm, aminosilane treated, epoxy/urethane-based greige agent)

MF: glass milled fiber (PEF-301S of Nitto Boseki Co., Ltd., diameter of 9 μm, number average fiber length of 30 μm)

CF: carbon fiber (Besfite HTA-C6-U of Toho Tenax Co., Ltd., fiber diameter: 7 μm, cut length: 6 mm, epoxy-based greige agent)

GFL: granulated glass flake (Freka REFG-301 of Nippon Sheet Glass Co., Ltd., median average particle diameter obtained by standard sieve method of 140 μm, thickness of 5 μm, epoxy-based greige agent)

Ni—CF: Nickel coated carbon fiber (Besfite MCHTA-C6-US (I) of Toho Tenax Co., Ltd., diameter 7.5 μm, cut length of 6 mm)

(Component H)

TALC: talc (Upn HS-T0.8 of Hayashi Kasei Kogyo Co., Ltd.)

MICA: mica (A-21 of Yamaguchi Mica Kogyosho Co., Ltd.)

WSN: wollastonite (NYGLOS4 of NYCO Co., Ltd.)

(Component I)

TiPC: titanium dioxide pigment (Taipake PC-3 of Ishihara Sangyo Kaisha, Ltd., the titanium dioxide pigment has an average particle diameter of 0.21 μm, contains about 93 wt % of $TiO_2$, about 2.5 wt % of $Al_2O_3$ and about 1.5 wt % of $SiO_2$ as inorganic surface coating agents and is surface treated with about 2 wt % of polymethyl hydrogen siloxane)

TiCR: titanium dioxide pigment (titanium dioxide pigment obtained by treating the surface of the Taipake CR-63 of Ishihara Sangyo Kaisha, Ltd. with about 2 wt % of polymethyl hydrogen siloxane (KF-99 of Shin-Etsu Chemical Co., Ltd.), the surface treatment was made by mixing together the Taipake CR-63 and KF-99 with a Henschel mixer. The Taipake CR-63 is a titanium dioxide pigment having an average particle diameter of 0.22 μm, containing about 97.5 wt % of $TiO_2$, about 1 wt % of $Al_2O_3$ and about 0.5 wt % of $SiO_2$ as inorganic surface coating agents, and surface treated with less than 1 wt % of an organosiloxane compound)

(Other Components)

TMP: trimethyl phosphate (TMP of Daihachi Chemical Industry Co., Ltd.)

IRGP: phosphite compound (Irgafos168 of Ciba Specialty Chemicals Holding Inc.)

EPQ: phosphorus-based stabilizer essentially composed of a phosphonite (Sandstab P-EPQ of Clariant Japan Co., Ltd.)

IRGX: hindered phenol-based antioxidant (Irganox1076 of Ciba Specialty Chemicals Holding Inc.)

PSR: coumarine-based fluorescent brightener (Haccol PSR of Haccol Chemicals Co., Ltd.

BVB: bluing agent (Microlex Violet B of Bayer AG)

DMP: dimethylphenyl phosphonate (manufactured by Nissan Chemical Industries, Ltd.)

CB: carbon black (Farnes Black #970 of Mitsubishi Chemical Corporation)

PEW: polyethylene wax (Hiwax 405MP of Mitsui Chemical Inc.)

D048: isobutyl trimethoxysilane (AY43-048 of Toray Dow Corning Co., Ltd.)

D3103: decyl trimethoxysilane (KBM3103 of Shin-Etsu Silicones KK)

DC30: acid modified olefin wax composed of a copolymer of maleic anhydride and an α-olefin (Diacalna PA30M of Mitsuibishi Chemical Corporation)

Examples 1 to 10 and Comparative Examples 1 to 3

(I-1) Evaluation Items (I-1-i) Flame Retardancy

Test samples having a shape in conformity with the UL Standard 94 and a thickness shown in Tables 1 to 3 were used to carry out a combustion test in accordance with the UL Standard 94 vertical test. The existence of dripping and the maximum number of seconds of combustion were recorded for a set of 5 test samples. For a sample which dripped, the maximum number of seconds of combustion was not recorded. The test samples were kept at a temperature of 23° C. and a relative humidity of 50% for 48 hours after molding. A combustion test was carried out by burning the test samples after storage.

(I-1-ii) Transparency

A smooth flat plate test sample having a length of 50 mm, a width of 50 mm, a thickness of 2.0 mm and a surface arithmetic average roughness (Ra) of 0.03 μm was manufactured by injection molding. The haze of the test sample was measured by the NDH-300A of Nippon Denshoku Co., Ltd. in accordance with JISK7105.

(I-2) Preparation of Samples

Resin compositions having composition shown in Tables 1 to 3 were prepared as follows. A pre-mixture of 1 wt % of the component B and the powder of the component A was prepared with a super mixer. A pre-mixture of other components was prepared in the same manner as described above except that the amount of the component C was 10 wt %. These pre-mixtures and the rest of the component A were weighed and mixed together in a ratio shown in Tables 1 to 3 to homogenize a mixture with a tumbler. Only in Example 2, a pre-mixture of the component B was directly supplied into an extruder to prepare a master pellet which was then mixed with the other components.

The obtained mixture was injected into an extruder to prepare a resin composition. A vented double-screw extruder having a diameter of 30 mm (KTX-30 of Kobe Steel Ltd.) was used as the extruder. As for screw constitution, a first kneading zone (consisting of 2 feed kneading discs, 1 feed rotor, 1 return rotor and 1 return kneading disk) was installed before the position of the vent, and a second kneading zone (consisting of 1 feed rotor and 1 return rotor) was installed after the position of the vent. A strand was extruded at a cylinder temperature of 280° C., a dice temperature of 280° C. and a vent suction pressure of 3 kPa, cooled in a water bath and cut with a pelletizer to obtain a pellet. The obtained pellet was dried with a hot air circulation drier at 120° C. for 6 hours and molded into a test sample with the IS150 EN-5Y injection molding machine of Toshiba Machine Co., Ltd. at a cylinder temperature of 300° C. and a mold temperature of 60° C. The molding cycle was 40 sec.

TABLE 1

| | Item | | Unit | Ex. 1 | Ex. 2 | Ex. 3 | Ex. 4 | C. Ex. 1 | C. Ex. 2 |
|---|---|---|---|---|---|---|---|---|---|
| Composition | Component A | PC-1 | pbw | 100 | 100 | 100 | 100 | 100 | 100 |
| | Total of component A | | pbw | 100 | 100 | 100 | 100 | 100 | 100 |
| | Component B | B-1 | pbw | 0.1 | 0.1 | | 0.15 | | |
| | | B-2 | pbw | | | 0.1 | | | 0.7 |
| | Components other than component B | B-4 | pbw | | | | | 0.1 | |
| | Component C | SiH | pbw | 1.5 | 1.5 | 1.5 | 1.5 | 1.5 | 1.5 |
| Material characteristics | Transparency | Haze | % | 1.0 | 1.0 | 1.0 | 18.0 | 1.0 | 86.0 |
| | Flame retardancy | Thickness of test sample | mm | 1.5 | 1.5 | 1.5 | 1.5 | 1.5 | 1.5 |
| | | Existence of dripping | — | No | No | No | No | Yes | Yes |
| | | Maximum number of seconds of combustion | sec | 6.0 | 6.1 | 7.3 | 7.2 | — | — |

Ex.: Example
C. Ex.: Comparative Example
pbw: part(s) by weight

TABLE 2

| | Item | | Unit | Ex. 5 | Ex. 6 | Ex. 7 | Ex. 8 |
|---|---|---|---|---|---|---|---|
| Composition | Component A | PC-1 | pbw | | | 100 | 100 |
| | | PC-2 | pbw | 50 | 90 | | |
| | | PC-3 | pbw | 50 | | | |
| | | PC-4 | pbw | | 10 | | |
| | Total of component A | | pbw | 100 | 100 | 100 | 100 |
| | Component B | B-1 | pbw | 0.1 | 0.1 | | 0.1 |
| | | B-5 | pbw | | | 0.1 | |
| | Component C | SiH | pbw | 1.5 | 1.5 | 1.5 | |
| | | X-40 | pbw | | | | 1 |
| | Others | TMP | pbw | 0.01 | | | |
| | | IRGP | pbw | | 0.03 | | |

TABLE 2-continued

| | Item | | Unit | Ex. 5 | Ex. 6 | Ex. 7 | Ex. 8 |
|---|---|---|---|---|---|---|---|
| Material characteristics | Transparency | Haze | % | 1.1 | 1.0 | 1.0 | 1.0 |
| | Flame retardancy | Thickness of test sample | mm | 1.5 | 1.5 | 1.5 | 1.5 |
| | | Existence of dripping | — | No | No | No | No |
| | | Maximum number of seconds of combustion | sec | 4.5 | 4.1 | 6.2 | 8.4 |

Ex.: Example
C. Ex.: Comparative Example
pbw: part(s) by weight

TABLE 3

| | Item | | Unit | Ex. 9 | Ex. 10 | C. Ex. 3 |
|---|---|---|---|---|---|---|
| Composition | Component A | PC-1 | pbw | 100 | 100 | 100 |
| | Component B | B-2 | pbw | 0.03 | | |
| | | B-5 | pbw | | 0.03 | |
| | Components other than component B | B-4 | pbw | | | 0.03 |
| | Component C | FG15 | pbw | 0.1 | 0.1 | 0.1 |
| | | KSS | pbw | 0.15 | 0.15 | 0.15 |
| | Component D | VPG | pbw | 0.3 | 0.3 | 0.3 |
| | Others | EPQ | pbw | 0.03 | 0.03 | 0.03 |
| Material characteristics | Transparency | Haze | % | 1.0 | 0.9 | 1.0 |
| | Flame retardancy | Thickness of test sample | mm | 2.8 | 2.8 | 2.8 |
| | | Existence of dripping | — | No | No | Yes |
| | | Maximum number of seconds of combustion | sec | 5.3 | 6.5 | — |

Ex.: Example
C. Ex.: Comparative Example
pbw: part(s) by weight

It is understood from comparison between Examples and Comparative Examples in Tables 1 to 3 that the aromatic polycarbonate resin composition of the present invention has excellent flame retardancy due to its dripping prevention effect. It is also understood that excellent transparency is achieved by selecting the amount of the particularly preferred component B.

Examples 11 and 12 and Comparative Example 4

(II-1) Evaluation Items (II-1-i) Flame Retardancy

The evaluation of flame retardancy was made on test samples having a thickness shown in Table 4 in the same manner as in (I-1-i).

(II-1-ii) Weatherability

A square plate obtained by the following method was treated for 1,000 hours with a one cycle time of 120 minutes consisting of 18 minutes of spraying water and 102 minutes of an interval without spraying water at a discharge voltage of 48 to 52 V, a black panel temperature of 63±3° C. and a humidity of 50% by using a sunshine weather meter (WEL-SUN: HC-B of Suga Shikenki Co., Ltd.) in accordance with JIS A 1415, and then the yellowness index YI of the plate was measured in accordance with JIS K 7103 to evaluate ΔYI difference before and after the treatment. The YI value was obtained from X, Y and Z values based on the following equation by using the Z-100 1DP of Nippon Denshoku Co., Ltd.

$$YI = [100 - (1.28 \times 1.06Z)]/Y$$

$$\Delta YI = YI \text{ after treatment} - YI \text{ before treatment}$$

(II-2) Preparation of Samples

Resin compositions having composition shown in Table 4 were prepared as follows. The components shown in Table 4 were weighed and uniformly mixed together with a tumbler, and the resulting mixture was supplied into the same extruder as that of Example 1 to prepare a resin composition pellet at the same temperature and the same vent suction pressure as in Example 1. The obtained pellet was dried with a hot air circulation drier at 120° C. for 6 hours and molded into a test sample and a square plate (50 mm in length×50 mm in width× 2.0 mm in thickness) with the same injection molding machine as in Example 1 at a cylinder temperature of 280° C. and a mold temperature of 60° C.

TABLE 4

| | Item | | Unit | Ex. 11 | Ex. 12 | C. Ex. 4 |
|---|---|---|---|---|---|---|
| Composition | Component A | PC-1 | pbw | 100 | 100 | 100 |
| | Component B | B-6 | pbw | 0.03 | 0.03 | |
| | Components other than component B | B-4 | pbw | | | 0.03 |
| | Component C | FG15 | pbw | 0.1 | | 0.1 |
| | | KSS | pbw | 0.15 | | 0.15 |
| | Component D | VPG | pbw | 0.25 | | 0.25 |
| | | EW | pbw | | 0.2 | |
| | Component E | UV79 | pbw | 0.3 | | 0.3 |
| | | CEIP | pbw | | 0.3 | |
| | Others | EPQ | pbw | | 0.03 | |
| | | IRGX | pbw | 0.05 | 0.05 | 0.05 |
| | | PSR | pbw | | 0.02 | |
| | | BVB | pbw | 0.00005 | | 0.0005 |
| Material characteristics | Weatherability (ΔYI) | | — | 16.8 | 11.2 | 19.0 |
| | Transparency | Haze | % | 1.0 | 0.9 | 1.0 |
| | Flame retardancy | Thickness of test sample | mm | 2.8 | 2.8 | 2.8 |
| | | Existence of dripping | — | No | No | Yes |
| | | Maximum number of seconds of combustion | sec | 4.5 | 7.8 | — |

Ex.: Example
C. Ex.: Comparative Example

It is understood from comparison between Examples and Comparative Example in Table 4 that the resin composition of the present invention has excellent weatherability.

Examples 13 to 18 and Comparative Examples 5 to 9

(III-1) Evaluation Items (II-1-i) Flame Retardancy

The evaluation of flame retardancy was made on test samples having a thickness shown in Tables 5 to 7 in the same manner as in (I-1-i).

(III-1-ii) Light Transmission of Molded Product

The light transmissions of molded products of samples containing no titanium dioxide pigment (Examples 13 and 14 and Comparative Examples 5 and 6) were observed. The light transmission is an index for confirming the cohesion of fibrillated PTFE. That is, when the fibrillated PTFE coheres, light transmission increases. The total transmissions of a plate at the time of molding (before residence) and at the time of 10-minute retention molding (after residence) were measured. A value obtained by subtracting the total transmission before residence from the total transmission after residence is taken as ΔTt. It can be said that as ΔTt becomes larger, the cohesion of the fibrillated PTFE proceeds more. The measurement plate was a three-stage plate having a width of 50 mm, a length of 90 mm and a thickness of 3 mm (length of 20 mm), 2 mm (length of 45 mm) and 1 mm (length of 25 mm) from the gate side. A 2 mm portion of the 3-stage plate was used for the measurement of total transmission. The total transmission was measured in accordance with JIS K7105 by using the HR-100 haze meter (of Murakami Shikisai Technical Research Institute).

(III-1-iii) Visual Inspection of Cohesion

As for the samples containing no titanium dioxide pigment (Examples 13 and 14 and Comparative Examples 5 and 6), the cohesion of the fibrillated PTFE was visually inspected. The same 3-stage plate as in (III-1-ii) was entirely observed to check the cohesion of the fibrillated PTFE.

(III-1-iv) L Value of Retention Molded Product

As for samples containing a titanium dioxide pigment (Examples 15 to 18 and Comparative Examples 7 to 9), the L value of a molded product obtained by 10-minute retention molding was observed. As the L value becomes smaller, the titanium dioxide pigment coheres more along with the cohesion of the fibrillated PTFE. That is, the cover-up effect of the titanium dioxide pigment is reduced by the cohesion of the pigment, and the black color of carbon black is emphasized instead. The measurement plate was the same 3-stage plate as in (III-1-ii) and its 2 mm thick portion was measured. A color computer (TC-1800MK-II of Tokyo Denshoku Co., Ltd.) was used for the measurement.

(III-1-v) Visual Inspection of Color Shade

As for the samples containing a titanium dioxide pigment (Examples 15 to 18 and Comparative Examples 7 to 9), color shade was visually inspected. The same 3-stage plate as in (III-1-ii) was entirely observed to check color shade. In Tables 6 and 7, "YES" means that the plate assumed an irregular color, that is, color shade observed, and "NO" means that the plate assumed a regular color, that is, color shade was not observed.

(III-2) Preparation of Samples

Resin compositions having composition shown in Tables 5 to 7 were prepared as follows. The components shown in Tables 5 to 7 were weighed and uniformly mixed together with a tumbler, and the resulting mixture was supplied into the same extruder as in Example 1 to prepare a resin composition pellet at the same temperature and the same vent suction pressure as in Example 1. The obtained pellet was dried with a hot air circulation drier at 120° C. for 6 hours and molded into a 3-stage plate and a combustion test sample with the same injection molding machine as in Example 1. The molding conditions include a cylinder temperature in the column "test sample molding temperature" in Tables 5 to 7 and a mold temperature of 70° C. The molding cycle of the 3-stage plate was 1 minute and the molding cycle of the combustion test sample was 40 seconds.

TABLE 5

| | Item | | Unit | Ex. 13 | Ex. 14 | C. Ex. 5 | C. Ex. 6 |
|---|---|---|---|---|---|---|---|
| Composition | Component A | PC-1 | pbw | 100 | | 100 | |
| | | PC-5 | pbw | | 100 | | 100 |
| | Component B | B-1 | pbw | 0.10 | | | |
| | | B-2 | pbw | | 0.10 | | |
| | Components other than Component B | B-3 | pbw | | | | 0.10 |
| | | B-4 | pbw | | | 0.10 | |
| | Component C | FG70 | pbw | | 2.0 | | 2.0 |
| | Component D | SL | pbw | | 0.30 | | 0.30 |
| | Component F | PTFE | pbw | 0.40 | 0.40 | 0.40 | 0.40 |
| | Others | Stabilizer *1 | pbw | | | | 0.05 |
| Material Characteristics | Test sample molding temperature | | °C. | 330 | 340 | 330 | 340 |
| | Flame retardancy | Thickness of test sample | mm | 1.0 | 1.0 | 1.0 | 1.0 |
| | | Existence of dripping | — | No | No | Yes | No |
| | | Maximum number of seconds of combustion | sec | 5.1 | 4.6 | — | 8.3 |
| | Change in total transmission(ΔTt) | | % | 1.3 | 1.5 | 1.6 | 1.8 |
| | Visual inspection of cohesion of PTFE | before residence | — | No | No | No | No |
| | | After 10 minutes of residence | — | No | No | Slightly Yes | Slightly Yes |

Ex.: Example
C. Ex.: Comparative Example
pbw: part(s) by weight
*1: 0.01 part by weight of TMP, 0.01 part by weight of DMP and 0.03 part by weight of IRGP based on 100 parts by weight of the component A

TABLE 6

| | Item | | Unit | Ex. 15 | Ex. 16 | Ex. 17 | C. Ex. 7 | C. Ex. 8 |
|---|---|---|---|---|---|---|---|---|
| Composition | Component A | PC-1 | pbw | 100 | | | 100 | |
| | | PC-6 | pbw | | 100 | 100 | | 100 |
| | Component B | B-1 | pbw | | 0.1 | 0.1 | | |
| | | B-2 | pbw | 0.1 | | | | |
| | Components other than component B | B-3 | pbw | | | | 0.1 | |
| | | B-4 | pbw | | | | | 0.1 |
| | Component C | X-40 | pbw | | | 0.5 | | 0.5 |
| | | FG70 | pbw | 2 | 2 | | 2 | |
| | Component D | EW | pbw | 0.25 | 0.3 | 0.3 | 0.25 | 0.3 |
| | Component E | LA31 | pbw | 1 | | | 1 | |
| | Component F | PTFE | pbw | 0.4 | 0.4 | 0.4 | 0.4 | 0.8 |
| | Others | stabilizer *1 | pbw | 0.05 | 0.05 | 0.05 | 0.05 | 0.05 |
| | | Colorant *2 | pbw | 0.53 | 0.53 | 0.53 | 0.53 | 0.53 |
| Material Characteristics | Test sample molding temperature | | °C. | 320 | 310 | 320 | 320 | 320 |
| | Flame retardancy | Thickness of test sample | mm | 1.2 | 1.2 | 1.2 | 1.2 | 1.2 |
| | | Existence of dripping | — | No | No | No | No | No |
| | | Maximum number of seconds of combustion | sec | 6.1 | 4.9 | 6.1 | 7.3 | 9.1 |
| | Color after 10 minutes of residence (L value) | | — | 20.4 | 23.1 | 22.0 | 18.8 | 20.0 |
| | Visual inspection of color shade (before residence) | | — | No | No | No | Yes | Yes |

Ex.: Example
C. Ex.: Comparative Example
pbw: part(s) by weight
*1: 0.01 part by weight of TMP, 0.01 part by weight of DMP and 0.03 part by weight of IRGP based on 100 parts by weight of the component A
*2: 0.5 part by weight of TiPC and 0.03 part by weight of CB based on 100 parts by weight of the component A

TABLE 7

| | Item | | Unit | Ex. 18 | C. Ex. 9 |
|---|---|---|---|---|---|
| Composition | Component A | PC-2 | pbw | 50 | 50 |
| | | PC-6 | pbw | 50 | 50 |
| | Component B | B-2 | pbw | 0.1 | |
| | Components other than component B | B-4 | pbw | | 0.1 |
| | Component C | SiH | pbw | 1 | 1 |
| | Component F | PTFE | pbw | 0.4 | 0.4 |
| | Others | stabilizer *1 | pbw | 0.05 | 0.05 |
| | | Colorant *2 | pbw | 0.53 | 0.53 |
| Material characteristics | Test sample molding temperature | | °C. | 310 | 310 |
| | Flame retardancy | Thickness of test sample | mm | 1.2 | 1.2 |

TABLE 7-continued

| Item | | Unit | Ex. 18 | C. Ex. 9 |
|---|---|---|---|---|
| | Existence of dripping | — | No | No |
| | Maximum number of seconds of combustion | sec | 4.1 | 5.2 |
| | Color after 10 minutes of residence (L value) | — | 22.9 | 21.1 |
| | Visual inspection of color shade (before residence) | — | No | Yes |

Ex.: Example
C. Ex.: Comparative Example
pbw: part(s) by weight
*1: 0.01 part by weight of TMP, 0.01 part by weight of DMP and 0.03 part by weight of IRGP based on 100 parts by weight of the component A
*2: 0.5 part by weight of TiPC and 0.03 part by weight of CB based on 100 parts by weight of the component A It is understood from comparison between Examples and Comparative Examples in Tables 5 to 7 that when the aromatic polycarbonate resin composition of the present invention comprises a specific alkali metal salt of a perfluoroalkanesulfonic acid, the cohesion of fibrillated PTFE and the color shade of a molded product caused by the cohesion are improved.

Examples 19 to 31, Comparative Examples 10 to 13 and Reference Example 1

(IV-1) Evaluation Items (IV-1-i) Flame Retardancy

The evaluation of flame retardancy was made on test samples having a thickness specified in Tables 8 and 9 in the same manner as in (I-1-i). The test samples were manufactured by injection molding at a molding cycle of 2 minutes. In Examples and Comparative Examples, flame retardancy ratings are shown, and even a sample which experienced dripping yielded a V-2 result.

(IV-1-ii) Fatigue Characteristics

The number of cycles to fracture was counted in a fatigue test by using so-called "C-shaped" test samples shown in FIG. 1 (rupture is a state where a sample cannot bear a test load and does not means that the test sample is broken into two). The average value of 3 test samples is taken as the number of cycles to fracture excluding a case where the number of cycles to fracture exceeds 100,000. The test was carried out at a temperature of 30° C., a relative humidity of 50%, a sine wave frequency of 1 Hz and a maximum load of 68.6 N (7 kgf). The Servo Pulser EHF-FD1-10LA of Shimadzu Corporation was used as a testing apparatus. The test samples were manufactured by injection molding at a cylinder temperature of 320° C., a mold temperature of 100° C. and a molding cycle of 90 seconds.

(IV-2) Preparation of Samples

Resin compositions having composition shown in Tables 8 and 9 were prepared as follows. Out of the components shown in Tables 8 and 9, components excluding the filler as the component G were mixed together with a twin-cylinder blender to prepare a mixture. After a homogeneous pre-mixture of 10 wt % of PTFE and the component A powder was prepared, it was mixed with the other components. The resulting mixture obtained with the twin-cylinder blender was supplied into the first injection port at the last part of a vented double-screw extruder having a screw diameter of 30 mm (TEX-30XSST of Nippon Steel Works, Ltd.). The filler as the component G was supplied from the second feed port at a halfway position of the cylinder by using a side feeder. All the charged raw materials were used in a predetermined ratio by using a meter. Extrusion was carried out by using a vacuum pump at a vacuum degree of 3 kPa, a cylinder temperature of 230 to 280° C. (almost equally raised from the barrel at the root of the screw to the dice), a screw revolution of 180 rpm and a delivery rate of 15 kg/hr. The extruded strand was cooled in a water bath and cut into a pellet with a pelletizer. The obtained pellet was dried with a hot air circulation drier at 120° C. for 6 hours. The pellet right after drying was molded into a combustion test sample and a fatigue test C-shaped sample by using an injection molding machine (IS150EN-5Y of Toshiba Machine Co., Ltd.). The molding conditions for the combustion test sample include a cylinder temperature of 310° C., a mold temperature of 80° C. and a molding cycle of 2 minutes. The molding conditions for the fatigue test C-shaped sample include a cylinder temperature of 320° C., a mold temperature of 100° C. and a molding cycle of 90 seconds.

TABLE 8

| | Item | | Unit | Ex. 19 | Ex. 20 | Ex. 21 | C. Ex. 10 | Ex. 22 |
|---|---|---|---|---|---|---|---|---|
| Composition | Component A | PC-6 | pbw | 100 | 100 | 100 | 100 | 100 |
| | Component B | B-1 | pbw | | 0.06 | 0.06 | | 0.06 |
| | | B-2 | pbw | 0.06 | | | | |
| | Components other than Component B | B-4 | pbw | | | | 0.06 | |
| | Component D | SL | pbw | 0.56 | 0.56 | 0.63 | 0.63 | 0.63 |
| | Component F | PTFE | pbw | 0.34 | 0.34 | 0.38 | 0.38 | 0.38 |
| | Component G | GF-1 | pbw | 7.33 | 11.22 | 25.27 | 25.27 | |
| | | GF-2 | pbw | | | | | 25.27 |
| | | MF | pbw | 3.95 | | | | |
| | Others | TMP | pbw | 0.02 | 0.02 | 0.03 | 0.03 | 0.03 |
| | | CB | pbw | 0.56 | | | | 0.56 |
| Material characteristics | Flame retardancy | Thickness of sample | mm | 1.6 | 1.6 | 1.6 | 1.6 | 1.6 |
| | | Existence of dripping | — | No | No | No | No | No |
| | | Maximum number of seconds of combustion | Sec | 3.9 | 4.1 | 4.3 | 6.0 | 4.0 |
| | | Rating | — | v-0 | v-0 | v-0 | v-0 | v-0 |
| | Fatigue characteristics | Number of cycles to fracture | Times | 1800 | 2700 | 14000 | 12000 | 29000 |

TABLE 8-continued

| | Item | | Unit | C. Ex. 11 | Ex. 23 | Ex. 24 | R. Ex. 1 |
|---|---|---|---|---|---|---|---|
| Composition | Component A | PC-6 | pbw | 100 | 100 | 100 | 100 |
| | Component B | B-1 | pbw | | | | |
| | | B-2 | pbw | | 0.06 | 0.07 | |
| | Components other than Component B | B-4 | pbw | 0.06 | | | |
| | Component D | SL | pbw | 0.63 | 0.63 | 0.72 | 0.63 |
| | Component F | PTFE | pbw | 0.38 | 0.38 | 0.43 | |
| | Component G | GF-1 | pbw | | | 28.93 | 25.16 |
| | | GF-2 | pbw | 25.27 | | | |
| | | MF | pbw | | 25.27 | 14.47 | |
| | Others | TMP | pbw | 0.03 | 0.03 | 0.03 | 0.03 |
| | | CB | pbw | 0.56 | | | |
| Material characteristics | Flame retardancy | Thickness of sample | mm | 1.6 | 1.6 | 1.6 | 1.6 |
| | | Existence of dripping | — | No | No | No | Yes |
| | | Maximum number of seconds of combustion | sec | 5.5 | 3.8 | 4.1 | — |
| | | Rating | — | v-0 | v-0 | v-0 | v-2 |
| | Fatigue characteristics | Number of cycles to fracture | Times | 25000 | 1100 | 23000 | 15000 |

Ex.: Example
C. Ex.: Comparative Example
pbw: part(s) by weight
R. Ex.: Reference Example

TABLE 9

| | Item | | Unit | Ex. 25 | Ex. 26 | Ex. 27 | C. Ex. 12 | Ex. 28 |
|---|---|---|---|---|---|---|---|---|
| Composition | Component A | PC-1 | pbw | 96.58 | 97.2 | 96.60 | 96.60 | 96.60 |
| | | PC-7 | pbw | | | | | |
| | Component contained in A-component | CBM | pbw | 4.89 | 4.0 | 4.85 | 4.85 | 4.85 |
| | | Total of Component A | pbw | 100 | 100 | 100 | 100 | 100 |
| | Component B | B-1 | pbw | 0.15 | | | | |
| | | B-2 | pbw | | 0.05 | 0.15 | | 0.15 |
| | Components other than Component B | B-4 | pbw | | | | 0.15 | |
| | Component D | SL | pbw | | 0.50 | | | |
| | Component G | GF-1 | pbw | | | 29.41 | 29.41 | 14.70 |
| | | CF | pbw | 45.92 | 10 | 15.44 | 15.44 | 30.14 |
| | | GFL | pbw | | | | | |
| | | Ni—CF | pbw | | | | | |
| | Others | TMP | pbw | 0.15 | 0.1 | 0.15 | 0.15 | 0.15 |
| | | PEW | pbw | | | | | |
| Material characterisitic | Flame retardancy | Thickness of sample | mm | 0.8 | 0.8 | 0.8 | 0.8 | 0.8 |
| | | Existence of dripping | — | Yes | Yes | Yes | Yes | Yes |
| | | Maximum number of seconds of combustion | sec | — | — | — | — | — |
| | | Rating | — | V-2 | V-2 | V-2 | V-2 | V-2 |
| | Fatigue characteristics | Number of cycle to fracture | Times | —*1 | 190000 | 240000 | 20000 | 490000 |

| | Item | | Unit | Ex. 29 | Ex. 30 | C.Ex. 13 | Ex. 31 |
|---|---|---|---|---|---|---|---|
| Composition | Component A | PC-1 | pbw | 96.60 | | | 97.37 |
| | | PC-7 | pbw | | 96.64 | 96.64 | |
| | Component A-containing component | CBM | pbw | 4.85 | 4.80 | 4.80 | 3.94 |
| | | Total of Component A | pbw | 100 | 100 | 100 | 100 |
| | Component B | B-1 | pbw | | 0.15 | | 0.12 |
| | | B-2 | pbw | 0.15 | | | |
| | Components other than Component B | B-4 | pbw | | | 0.15 | |
| | Component D | SL | pbw | | | | |
| | Component G | DF-1 | pbw | 29.41 | | | |
| | | CF | pbw | 15.44 | | | |
| | | GFL | pbw | | 43.60 | 43.60 | |
| | | Ni—CF | pbw | | | | 17.92 |
| | Others | TMP | pbw | 0.15 | 0.15 | 0.15 | 0.12 |
| | | PEW | pbw | 0.30 | | | |

TABLE 9-continued

| Material characteristics | Flame retardancy | Thickness of sample | mm | 0.8 | 1.0 | 1.0 | 1.0 |
|---|---|---|---|---|---|---|---|
| | | Existence of dripping | — | Yes | Yes | Yes | Yes |
| | | Maximum number of seconds of combustion | sec | — | — | — | — |
| | | Rating | — | V-2 | V-2 | V-2 | V-2 |
| | Fatigue characteristics | Number of cycles to fracture | Times | 490000 | 50000 | 44000 | 39000 |

Ex.: Example
C. Ex.: Comparative Example
pbw: part(s) by weight
*1did not break at 1,000,000 cycles.

It is understood from comparison between Examples and Comparative Examples in Tables 8 and 9 that when the aromatic polycarbonate resin composition of the present invention comprises a specific alkali metal salt of a perfluoroalkanesulfonic acid, fatigue characteristics are improved as compared with a conventional alkali metal salt. Further, it is also excellent in flame retardancy.

Examples 32 to 35 and Comparative Examples 14 and 15

(V-I) Evaluation Items (V-I-i) Flame Retardancy
The evaluation of flame retardancy was made on test samples having a thickness shown in Tables 10 and 11 in the same manner as in (I-1-i). In Examples and Comparative Examples, flame retardancy ratings are also shown.
(V-1-ii) Color
A housing for a notebook type personal computer shown in FIG. 2 was molded to observe its color. Up to 10 shots right after purge were discarded and an 11-th shot was used for the evaluation of color. The L value of a mirror portion of the molded housing was measured as color by using a color computer (TC-1800MK-II of Tokyo Denshoku Co., Ltd.). As the L value becomes larger, the brightness becomes higher and an excellent white color is seen. Therefore, in this evaluation, a higher L value is more preferred.
(V-1-iii) Measurement of a Reduction in Molecular Weight (ΔMv)
After the obtained pellet was dried with a hot air drier at 120° C. for 6 hours, it was molded into molded products including a tensile test sample at a cylinder temperature of 310° C. and a mold temperature of 90° C. by using an injection molding machine (SG-150U of Sumitomo Heavy Industries, Ltd.) After molded products were continuously formed from 20 shots, the injection cylinder was recessed after metering was completed and the molten resin was retained in the cylinder for 10 minutes. After the retention, the molding of 4 shots was carried out again under the same conditions. Molded products of the resin composition retained in the cylinder were formed by molding. The viscosity average molecular weight of a molded product of a 2nd shot was measured by the method described in this text. Meanwhile, the viscosity average molecular weight of a molded product of a 20-th shot before residence was measured likewise. The value obtained by subtracting the molecular weight after residence from the molecular weight before residence was evaluated as ΔMv. As ΔMv becomes smaller, the heat stability becomes higher.
(V-I-iv) Measurement of Tensile Yield Elongation After Residence
A tensile test was made on tensile test samples of first to third shots out of the molded products of the resin composition retained in the injection molding machine and prepared for the evaluation (V-1-ii). The yield elongation value was measured in this test to compare the toughness of each material. The average value of three molded products is shown in Tables 10 and 11. As the yield elongation value becomes larger, the toughness becomes higher and the heat stability becomes better. The tensile test samples and the tensile test were based on ISO527-1 and 527-2, the test sample had a length of 175 mm, a width of 10 mm and a thickness of 4 mm, and the test speed was 5 mm/min.
(V-1-v) Moist Heat Resistance
Parts shown by broken lines in FIG. 3 were cut out from a molded product of a 19-th shot out of the molded housings for a notebook type personal computer shown in FIG. 2 prepared for the evaluation of appearance (in such a manner that bosses or ribs were not existent on the rear surface) to prepare an evaluation sample. This sample was treated at a temperature of 120° C., a relative humidity of 100% and a pressure of 196 kPa (2 atm.) with a Pressure cracker tester (the super acceleration life test apparatus (PC-305III/V) of Hirayama Seisakusho Co., Ltd.) for 24 hours. The retention was calculated from the viscosity average molecular weights before and after the treatment. Three samples were cut out and the average value of these samples is shown in Tables 10 and 11.

(V-2) Preparation of Samples

Resin compositions having composition shown in Tables 10 and 11 were prepared as follows. An aromatic polycarbonate resin, a fluorine-containing organic metal salt compound and other components including a silane compound were uniformly mixed together in a ratio shown in Tables 10 and 11 with a tumbler to prepare a pre-mixture. This mixture was supplied from the first feed port located at the base of the screw of the extruder. Before supply to the tumbler, the other components and the PC-2 powder were uniformly mixed together to obtain a master having a predetermined concentration. The master contained 2.5 wt % of PTFE and 10 wt % of other components. A silicate mineral as the component H was supplied into the molten resin from the second port at a halfway position of the extruder by using a side feeder. The extrusion conditions include a cylinder temperature of 280° C., a screw revolution of 120 rpm, a delivery rate of 20 kg/h and a vent suction pressure of 3 kPa. A strand was melt extruded, cooled in a cooling tank and cut into a pellet with a pelletizer. A vented double-screw extruder (TEX-30XSST of Nippon Steel Works, Ltd.) having the same screw diameter of 30 mm as in (IV-2) was used as the extruder.

The obtained pellet was dried with a hot air circulation drier at 120° C. for 5 hours. After drying, molded products including a tensile test sample and a test sample for the evaluation of combustibility were formed at a cylinder temperature of 310° C., a mold temperature of 90° C. and a molding cycle of 40 seconds with an injection molding machine (SG-150U of Sumitomo Heavy Industries, Ltd.).

Figure 2:
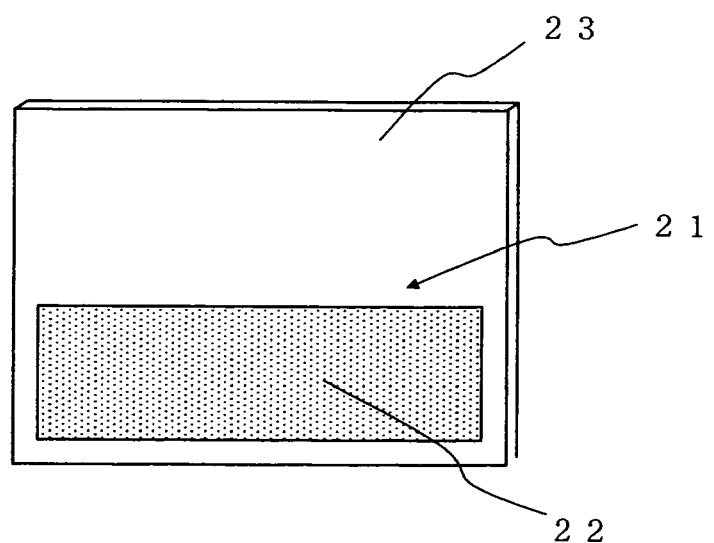
FIG. 2 is a perspective view of the front side of a molded product shaped like the housing of a notebook personal computer used in Example (178 mm in length×245 mm in width× 10 mm in height, thickness of 1.2 mm)
Figure 3:
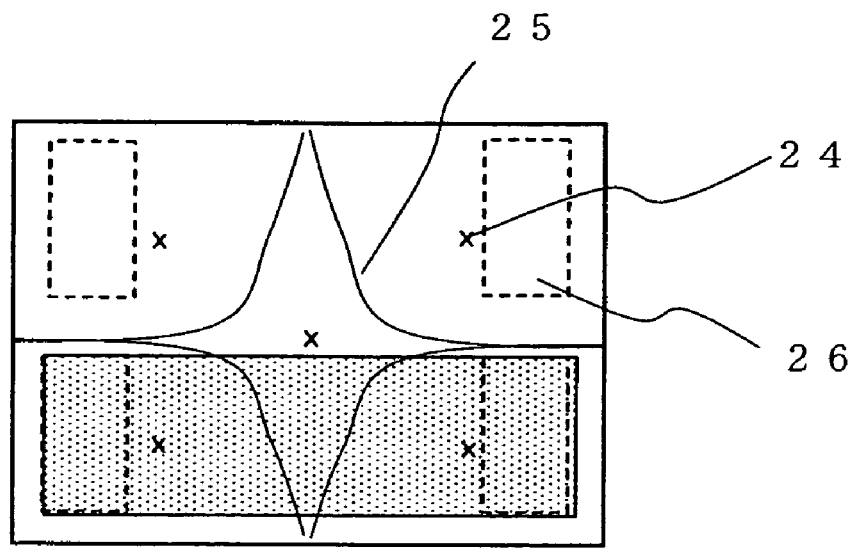
FIG. 3 is a front view of the front side of a molded product used in Example, showing gate positions, weld lines and cut-out portions of a sample to be evaluated.
Figure 4:
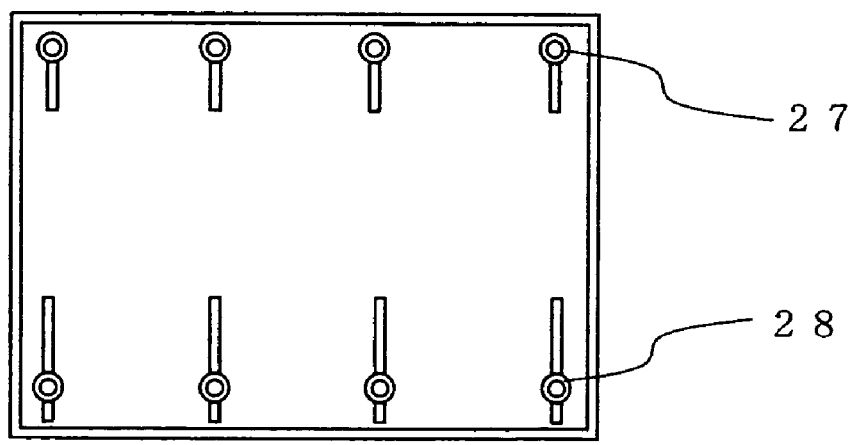
FIG. 4 is a front view of the rear side of a molded product used in Example, showing bosses with a rib (there are bosses having ribs on the both side on frosted surface portion).

The dried pellet was molded into a housing for a notebook type personal computer shown in FIG. 2 by using an injection molding machine (ULTRA220-NIVA of Sumitomo Heavy Industries, Ltd.) having an inner diameter of 50 mm at a cylinder temperature of 300° C., a mold temperature of 80° C. and an injection rate of 75 mm/sec. The characteristic properties of these molded products were measured. The results are shown in Tables 10 and 11. The molded housings for a notebook type personal computer were excellent without a warp.

TABLE 10

| | Item | | Unit | Ex. 32 | C. Ex. 14 | Ex. 33 |
|---|---|---|---|---|---|---|
| Composition | Component A | PC-2 | pbw | 50 | 50 | 50 |
| | | PC-6 | pbw | 50 | 50 | 50 |
| | Component B | B-1 | pbw | 0.05 | | |
| | | B-2 | pbw | | | 0.05 |
| | Components other than component B | B-3 | pbw | | 0.05 | |
| | Component E | UV79 | pbw | 0.3 | 0.3 | 0.3 |
| | Component F | PTFE | pbw | 0.5 | 0.5 | |
| | | B449 | pbw | | | 1 |
| | Component H | TALC | pbw | 18 | 18 | 18 |
| | others | D048 | pbw | 0.6 | 0.6 | |
| | | D3103 | pbw | | | 0.9 |
| | | DC30 | pbw | 0.7 | 0.7 | |
| | | TMP | pbw | 0.05 | 0.05 | 0.05 |
| Material characteristics | Flame retardancy | thickness of test sample | mm | 1.6 | 1.6 | 1.6 |
| | | Existence of dripping | — | No | No | No |
| | | Maximum number of seconds of combustion | sec | 5.2 | 8.3 | 6.4 |
| | | Rating | — | V-0 | V-0 | V-0 |
| | | L value | — | 41.5 | 39.5 | 40.6 |
| | | Δ Mv | — | 600 | 1000 | 600 |
| | | Tensile yield elongation after residenc | % | 7.2 | 5.7 | 6.5 |
| | | Moist heat resistance | % | 100 | 97 | 100 |

Ex.: Example
C. Ex.: Comparative Example
pbw: part(s) by weight

TABLE 11

| | Item | | Unit | Ex. 34 | C. Ex. 15 | Ex. 35 |
|---|---|---|---|---|---|---|
| Composition | Component A | PC-2 | pbw | 50 | 50 | 50 |
| | | PC-6 | pbw | 50 | 50 | 50 |
| | Component B | B-1 | pbw | 0.05 | | 0.05 |
| | Components other than component B | B-3 | pbw | | 0.05 | |
| | Component E | UV79 | pbw | 0.3 | 0.3 | 0.3 |
| | Component F | PTFE | pbw | 0.5 | 0.5 | 0.5 |
| | Component H | MICA | pbw | 18 | 18 | |
| | | WSN | pbw | | | 18 |
| | Others | D048 | pbw | 0.6 | 0.6 | 0.6 |
| | | DC30 | pbw | 0.7 | 0.7 | 0.7 |
| | | TMP | pbw | 0.05 | 0.05 | 0.05 |
| Material characteristics | Flame retardancy | thickness of test sample | mm | 1.6 | 1.6 | 1.6 |
| | | Existence of dripping | — | No | No | No |
| | | Maximum number of seconds of combustion | sec | 7.8 | 9.1 | 7.8 |
| | | Rating | — | V-0 | V-0 | V-0 |
| | | L value | — | 38.5 | 37.2 | 40.6 |
| | | ΔMv | — | 200 | 600 | 200 |

TABLE 11-continued

| Item | Unit | Ex. 34 | C. Ex. 15 | Ex. 35 |
|---|---|---|---|---|
| Tensile yield elongation after residenc | % | 2.3 | 2 | 4.6 |
| Moist heat resistance | % | 99 | 95 | 99 |

Ex.: Example
C. Ex.: Comparative Example
pbw: part(s) by weight

As obvious from the above tables, it is understood that the aromatic polycarbonate resin composition of the present invention has improved color, heat stability and moist heat resistance. The resin composition also has excellent flame retardancy. Particularly, excellent color having high whiteness is achieved by talc.

Examples 36 to 40 and Comparative Examples 16 to 20

(VI-1) Evaluation Items (VI-1-i) Flame Retardancy

The evaluation of flame retardancy was made on test samples having a thickness shown in Tables 12 and 13 in the same manner as in (I-1-i).

(VI-1-ii) Existence of Silver Streak

Molded products weighing about 90 g and including a 3-stage plate having a width of 50 mm, a length of 90 mm and a thickness of 3 mm (length of 20 mm), 2 mm (length of 45 mm) and 1 mm (length of 25 mm) from the gate side were formed by injection molding. The existence of a silver streak on the 3-stage plate was checked to evaluate the heat stability of the resin composition. Injection molding was carried out by using the SG-150U of Sumitomo Heavy Industries, Ltd. 30 shots were molded continuously. In the tables, X means that a silver streak was seen on any one of 30 3-stage plates. On the other hand, ○ means that no silver streak was seen at all. Evaluation was made at cylinder temperatures of 270° C., 280° C. and 290° C.

(VI-1-iii) Evaluation of a Change in Molecular Weight

A 10-minute residence test was carried out during the molding of the above 3-stage plates at a cylinder temperature of 270° C. to observe a change in molecular weight so as to evaluate the heat stability of the resin composition. The residence test was carried out by performing the continuous molding of 30 shots in (VI-1-ii), moving the cylinder backward after metering was completed, maintaining that state for 10 minutes and resuming molding. 4 shots of the resin were retained in the inside of the cylinder. The difference (M1−M2) between the viscosity average molecular weight (M1) of a 3-stage plate of a 10-th shot molded before residence and that (M2) of a 3-stage plate of a 2nd shot molded after residence is taken as a reduction in molecular weight (ΔM) in the tables.

(VI-1-iv) Evaluation of a Change in Light Reflectance

The light reflectance of a 2 mm-thick portion of the above 3-stage plate was measured with a color computer (TC-1800MK-II of Tokyo Denshoku Co., Ltd.). The light reflectance was evaluated by using the lowest value at a wavelength of 450 to 850 nm. The 3-stage plate of a 10-th shot molded before residence and the 3-stage plate of a 2nd shot molded after residence in (VI-1-iii) were used for the above measurement. The difference (Rt1−Rt2) between the light reflectance (Rt1) of the former and the light reflectance (Rt2) of the latter is taken as a reduction in light reflectance (ΔRt) in the tables.

(VI-1-v) Evaluation of a Change in b Value

A change in the b value of the 3-stage plate was evaluated by using a color computer in the same manner as the measurement of (VI-1-iv). The difference (b2−b1) between the b value (b2) of a 3-stage plate of a 2nd shot molded after residence and the b value (b1) of a 3-stage plate of a 10-th shot molded before residence is taken as an increased molecular weight in the b value (Δb) in the tables. The b values of the molded products were all positive.

(VI-2) Preparation of Samples

Resin compositions having composition shown in Tables 12 and 13 were prepared as follows. The components shown in Tables 12 and 13 were weighed and uniformly mixed together with a Henschel mixer to prepare a mixture which was then supplied into the same extruder as in Example 1 to prepare a resin composition pellet at the same temperature and the same vent suction pressure as in Example 1. The obtained pellet was dried with a hot air circulation drier at 120° C. for 6 hours. The dried pellet was molded into molded products as heavy as about 90 g including a 3-stage plate and a combustion test sample by using an injection molding machine (SG-150U of Sumitomo Heavy Industries, Ltd.). The molding conditions for molded products including the 3-stage plate include cylinder temperatures of 270° C., 280° C. and 290° C. and a mold temperature of 80° C. The molding cycle of the 3-stage plate was 50 seconds, and the molding cycle of the combustion test sample was 35 seconds.

TABLE 12

| | Item | | Unit | Ex. 36 | Ex. 37 | Ex. 38 | Ex. 39 | Ex. 40 |
|---|---|---|---|---|---|---|---|---|
| Composition | Component A | PC-2 | pbw | 50 | 50 | 50 | 50 | 50 |
| | | PC-6 | pbw | 50 | 50 | 50 | 50 | 50 |
| | Component B | B-1 | pbw | 0.04 | 0.02 | 0.02 | 0.02 | 0.04 |
| | Component D | SL | pbw | 0.3 | 0.3 | 0.3 | 0.3 | 0.3 |
| | Component F | PTFE | pbw | 0.5 | 0.5 | 0.5 | 0.5 | |
| | Component I | TiPC | pbw | 10 | 20 | 10 | | 15 |
| | | TiCR | pbw | | | | 10 | |
| | Others | TMP | pbw | 0.05 | 0.05 | 0.05 | 0.05 | 0.05 |

TABLE 12-continued

| | Item | | Unit | Ex. 36 | Ex. 37 | Ex. 38 | Ex. 39 | Ex. 40 |
|---|---|---|---|---|---|---|---|---|
| Material Characteristics | Flame Retardancy | Thickness of test sample | mm | 1.6 | 1.6 | 1.6 | 1.6 | 1.6 |
| | | Existence of dripping | — | No | No | No | No | Yes |
| | | Maximum number of seconds of combustion | sec | 5.2 | 5.5 | 5.9 | 5.2 | — |
| | Generation of a silver streak | 270° C. | — | ○ | ○ | ○ | ○ | ○ |
| | | 280° C. | — | ○ | ○ | ○ | ○ | ○ |
| | | 290° C. | — | X | X | ○ | ○ | X |
| | Change in molecular weight | ΔM | — | 0.7 | 0.8 | 0.4 | 0.1 | 1.0 |
| | Reflectance before residence | Rt1 | — | 95.8 | 96.7 | 95.8 | 94.8 | 96.3 |
| | Change in reflectance | ΔRt | — | 0.7 | 0.7 | 0.5 | 0.1 | 0.9 |
| | Change in b value | Δb | — | 0.1 | 0.1 | 0.0 | 0.0 | 0.1 |

Ex.: Example
pbw: part(s) by weight

TABLE 13

| | Item | | Unit | C. Ex. 16 | C. Ex. 17 | C. Ex. 18 | C. Ex. 19 | C. Ex. 20 |
|---|---|---|---|---|---|---|---|---|
| Composition | Component A | PC-2 | pbw | 50 | 50 | 50 | 50 | 50 |
| | | PC-6 | pbw | 50 | 50 | 50 | 50 | 50 |
| | Components other than Component B | B-3 | pbw | 0.04 | | | | 0.04 |
| | | B-4 | pbw | | 0.02 | | 0.02 | |
| | Component D | SL | pbw | 0.3 | 0.3 | 0.3 | 0.3 | 0.3 |
| | Component F | PTFE | pbw | 0.5 | 0.5 | 0.5 | 0.5 | |
| | Component I | TiPC | pbw | 10 | 10 | 10 | 20 | 15 |
| | Others | TMP | pbw | 0.05 | 0.05 | 0.05 | 0.05 | 0.05 |
| Material Characteristics | Flame Retardancy | Thickness of test sample | mm | 1.6 | 1.6 | 1.6 | 1.6 | 1.6 |
| | | Existence of dripping | — | No | No | No | No | Yes |
| | | Maximum number of seconds of combustion | sec | 7.9 | 8.8 | 20.1 | 8.1 | — |
| | Generation of a silver streak | 270° C. | — | ○ | ○ | ○ | X | ○ |
| | | 280° C. | — | X | X | ○ | X | X |
| | | 290° C. | — | X | X | ○ | X | X |
| | Change in molecular weight | ΔM | — | 1.5 | 1.3 | 0.2 | 2.0 | 1.9 |
| | Reflectance before residence | Rt1 | — | 95.7 | 95.7 | 95.8 | 96.6 | 96.2 |
| | Change in reflectance | ΔRt | — | 1.3 | 1.0 | 0.1 | 1.6 | 1.5 |
| | Change in b value | Δb | — | 0.2 | 0.2 | 0.0 | 0.3 | 0.3 |

C. Ex.: Comparative Example
pbw: part(s) by weight

It is understood from comparison between Examples and Comparative Examples in Tables 12 and 13 that the aromatic polycarbonate resin composition containing a titanium dioxide pigment in a high concentration of the present invention has excellent flame retardancy, suppresses the generation of a silver streak and a reduction in molecular weight, rarely deteriorates in light reflectance and color and has stable light reflection characteristics when it comprises a specific alkali metal salt of a perfluoroalkylsulfonic acid.

Example 41

A light reflector for an LED array type backlight having a bottomed lattice-like shape was molded out of the polycarbonate resin composition of Example 38 to manufacture a liquid crystal display. A silver streak was observed in a light reflector molded out of the resin composition of Comparative Example 16 and charging became unsatisfactory at a resin temperature without a silver streak, thereby making it impossible to obtain a satisfactory molded product.

INDUSTRIAL FEASIBILITY

The aromatic polycarbonate resin composition of the present invention is very useful in the fields of electronic and electric appliances, OA equipment, car parts, mechanical parts, agricultural materials, conveyance containers, play tools and miscellaneous goods. For example, a transparent resin composition can be advantageously used in communication cable couplers, conductor parts, car window glass, car interior parts, LED lenses, floodlight covers, electronic circuit board covers, wattmeter covers, dummy bottles, optical disk cartridge cases and flat panel display protective covers. For instance, a resin composition comprising a filler such as glass fibers or carbon fibers and a silicate mineral such as mica or talc is suitable for use in molded products such as housings, covers and frames for electronic and electric appliances and precision instruments. The above electric and electronic appliances include personal computers, notebook type personal computers, game machines, displays, for housing dielectric coil type power transmission systems, printers and copiers, and the precision instruments include cameras. More specifically, an aromatic polycarbonate resin composition comprising carbon fibers is advantageously used in camera lens barrels, and an aromatic polycarbonate resin composition comprising metal coated carbon fibers is advantageously used in housings, covers and frames for digital image information processing devices such as digital still cameras. The resin composition comprising a filler and a silicate mineral of the present invention can be used in structural parts such as car parts, power generators (typified by the blades of wind power generators), connectors, cable couplers, gears, turntables, rotors and screws. Further, a resin composition comprising a titanium dioxide pigment in a high concentration is advantageously used in light reflectors. More specifically, the light reflectors include lamp reflectors such as reflectors for floodlights such as fluorescent lamps, backlight reflectors for displays such as liquid crystal displays, reflectors for switches, reflectors for LED arrays and reflectors having a combined function thereof. An industrial effect provided by the aromatic polycarbonate resin composition of the present invention is extremely large.

The invention claimed is:

1. An aromatic polycarbonate resin composition consisting of:
   (1) 100 parts by weight of an aromatic polycarbonate resin (component A);
   (2) 0.008 to 0.13 part by weight of an alkali metal salt of a perfluoroalkylsulfonic acid (component B) having a fluoride ion content measured by ion chromatography of 0.2 to 1 ppm in terms of weight based on the weight of component B; and
   (3) 0.01 to 5 parts by weight of silicone having a Si—H group and a phenyl group (component C).

2. The resin composition according to claim 1, wherein a smooth flat plate having an arithmetic surface roughness (Ra) of 0.03 μm and a thickness of 2 mm molded out of the resin composition has a haze value measured in accordance with JIS K7105 of 0.3 to 20%.

3. The resin composition according to claim 1, wherein the component B is obtained through (i) the step of obtaining a solution containing an alkali metal salt of a perfluoroalkylsulfonic acid and ion exchange water by neutralizing a perfluoroalkylsulfonic acid or perfluoroalkylsulfonyl fluoride with a carbonate or hydroxide of an alkali metal, (ii) the step of obtaining a precipitate by cooling the solution, (iii) the step of separating the precipitate, (iv) the step of washing the separated precipitate with ion exchange water and (v) the step of drying the washed product.

4. A molded product formed from the resin composition of claim 1.

5. A process of manufacturing an aromatic polycarbonate resin composition according to claim 1, by mixing together (1) 100 parts by weight of an aromatic polycarbonate resin (component A), (2) 0.008 to 0.13 part by weight of a fluorine-containing organic metal salt (component B) having a fluoride ion content measured by ion chromatography of 0.2 to 1 ppm in terms of weight and (3) 0.01 to 5 parts by weight of silicone having a Si—H group and a phenyl group (component C), to obtain the composition of claim 1.

6. The manufacturing process according to claim 5, wherein the component B is manufactured through (i) the step of obtaining a solution containing an alkali metal salt of a perfluoroalkylsulfonic acid and ion exchange water by neutralizing a perfluoroalkylsulfonic acid or perfluoroalkylsulfonyl fluoride with a carbonate or hydroxide of an alkali metal, (ii) the step of obtaining a precipitate by cooling the solution, (iii) the step of separating the precipitate, (iv) the step of washing the separated precipitate with ion exchange water and (v) the step of drying the washed product, and mixed with the component A.

* * * * *